(12) United States Patent
Fry et al.

(10) Patent No.: US 11,960,830 B2
(45) Date of Patent: Apr. 16, 2024

(54) EXPLORATORY DATA INTERFACE

(71) Applicant: International Business Machines Corporation, Armonk, NY (US)

(72) Inventors: Jonathan Fry, Fishkill, NY (US); Cheng-Tin Luo, Pleasant Valley, NY (US); Cheng-Yi Lin, Hopewell Junction, NY (US); Dureseti Chidambarrao, Weston, CT (US); Jang Sim, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/780,876

(22) Filed: Feb. 3, 2020

(65) Prior Publication Data
US 2021/0240921 A1     Aug. 5, 2021

(51) Int. Cl.
| | |
|---|---|
| *G06F 40/18* | (2020.01) |
| *G05B 19/418* | (2006.01) |
| *G06F 40/137* | (2020.01) |

(52) U.S. Cl.
CPC ......... *G06F 40/18* (2020.01); *G05B 19/4183* (2013.01); *G05B 19/4187* (2013.01); *G06F 40/137* (2020.01)

(58) Field of Classification Search
CPC ........ G06F 40/10; G06F 40/18; G06F 40/137; G05B 19/4187; G05B 19/4183
See application file for complete search history.

(56) References Cited

U.S. PATENT DOCUMENTS

| | | |
|---|---|---|
| 6,324,481 B1 | 11/2001 | Atchison et al. |
| 6,546,523 B1 | 4/2003 | Boorananut et al. |
| 6,708,074 B1 | 3/2004 | Chi et al. |

(Continued)

FOREIGN PATENT DOCUMENTS

JP     2006164219     6/2006

OTHER PUBLICATIONS

"Excel Forum: MS Office Application Help,—Can i trace dependents cells on another sheet", forum conversation Jan. 2007, referred to as Forum in the Office Action, retrieved from https://www.excelforum.com/excel-general/58661 (Year: 2007).*

(Continued)

*Primary Examiner* — Sanchita Roy
(74) *Attorney, Agent, or Firm* — Samuel Waldbaum; Otterstedt & Kammer PLLC

(57) ABSTRACT

A method for production analysis includes: receiving production data at a processor from a plurality of tools spatially arranged within a manufacturing facility; creating a hierarchal topology of the data in the processor, wherein each level of the hierarchal topology is based on a different one of a plurality of static parameters that are selected from a list consisting of: a tool identifier, a batch identifier, and a spatial orientation; displaying, at a user interface implemented by the processor, a first analysis of a first level of the hierarchal topology, wherein the analysis contains parameters related to other levels of the hierarchal topology; receiving, via the user interface, a selection by a user of a first parameter displayed on the first analysis; and updating the user interface to display a second analysis of a second level of the hierarchal topology that is related to the first parameter.

13 Claims, 19 Drawing Sheets

(56) References Cited

U.S. PATENT DOCUMENTS

| | | |
|---|---|---|
| 7,127,317 B2 | 10/2006 | Chiu et al. |
| 7,630,858 B1 | 12/2009 | Weiher-Telford et al. |
| 8,078,552 B2 | 12/2011 | Kaushal et al. |
| 10,372,808 B1* | 8/2019 | Kaptur .................. G06F 40/18 |
| 2006/0128039 A1 | 6/2006 | Lin et al. |
| 2008/0033589 A1* | 2/2008 | Ontalus ............ G05B 19/41875 <br> 700/109 |
| 2009/0006436 A1 | 1/2009 | Alqudah et al. |
| 2009/0235152 A1* | 9/2009 | Rampson .............. G06T 11/206 <br> 715/207 |
| 2010/0204940 A1 | 8/2010 | Barthold et al. |
| 2013/0111321 A1* | 5/2013 | Dorrell ................ G06F 40/177 <br> 715/215 |
| 2014/0053091 A1* | 2/2014 | Hou .................... G06F 3/04886 <br> 715/810 |
| 2017/0185058 A1* | 6/2017 | Holverson ............. G06Q 10/06 |
| 2018/0075117 A1* | 3/2018 | Wong ..................... G06F 40/183 |
| 2018/0089866 A1* | 3/2018 | Cox ........................ G06F 40/55 |
| 2019/0121847 A1* | 4/2019 | Castaneda-Villagran .................. <br> G06N 20/00 |
| 2019/0147032 A1* | 5/2019 | Olkin ...................... G06F 40/18 <br> 715/212 |

OTHER PUBLICATIONS

"Excel at Work: Link cells in the same or different Excel worksheets" by Sharyn Baines, dated Jun. 21, 2018, referred to as Baines in the Office Action, retrieved from https://excelatwork.co.nz/2018/06/21/link-cells-in-the-same-or-different-excel-worksheets/ (Year: 2018).*

"How to Geek: How to Cross Reference Cells Between Microsoft Excel Spreadsheets" by Alan Murray, Retrieved from https://www.howtogeek.com/426633/how-to-cross-reference-cells-between-microsoft-excel-sprea (Year: 2019).*

"Find a P-Value with Excel" by Jennifer Alpeche dated Jul. 27, 2017 and retrieved from https://ms-office.wonderhowto.com/how-to/find-p-value-with-excel-346366/ (Year: 2017).*

\* cited by examiner

Ranked Lot Summary View 1000 ← From 700 / 510

Product ILT M1 ED HOL By Lot and Wafer: 13NOV19

| datec | LG4 FC | Sub Lot Type | lvl | Fab8 Lotid | NO EWR Split | Wafs | No Scrap Waf | ED APDM YLD | ED Metric 1 | ED Metric 2 | ED Metric 3 | ED Metric 4 | ED Metric 5 |
|---|---|---|---|---|---|---|---|---|---|---|---|---|---|
| 190826 | TT | PR | V0 | X34000 | 0 | 6 | 6 | 0 | 0 | 0 | 99 | 96 | 100 |
| 191018 | TT | PR | V0 | X42001 | 0 | 6 | 6 | 12 | 56 | 93 | 18 | 100 | 100 |
| 191012 | TT | PR | V0 | X41000 | 0 | 6 | 6 | 16 | 98 | 100 | 17 | 100 | 100 |
| 191028 | TT | PR | V0 | X43009 | 0 | 10 | 5 | 17 | 17 | 100 | 100 | 100 | 100 |
| 191030 | TT | PR | V0 | X43021 | 0 | 6 | 10 | 18 | 30 | 95 | 87 | 100 | 100 |
| 191016 | TT | PR | V0 | X41023 | 0 | 6 | 6 | 23 | 28 | 90 | 100 | 100 | 100 |
| 191028 | TT | PR | V0 | X43003 | 0 | 6 | 5 | 31 | 38 | 91 | 100 | 100 | 100 |
| 191027 | TT | PR | V0 | X42013 | 0 | 6 | 6 | 34 | 37 | 98 | 98 | 100 | 100 |
| 191028 | TT | PR | V0 | X43013 | 0 | 1 | 1 | 35 | 40 | 95 | 100 | 100 | 100 |
| 191022 | TT | PR | V0 | X42012 | 0 | 6 | 6 | 38 | 38 | 100 | 100 | 100 | 100 |
| 191017 | TT | PR | V0 | X42000 | 0 | 6 | 6 | 38 | 38 | 100 | 99 | 100 | 100 |

EWR_Name= 371_Grp

| TEST Date | Fab8_Lotid | Split Cell Description | Sub Lot Type | WAFER_ID | WAC Parm1 | WAC Parm2 | FEOL FC | DOE OA | MOL HOL | Metric 1 | Metric 2 | Metric 3 | Metric 4 | Metric 5 |
|---|---|---|---|---|---|---|---|---|---|---|---|---|---|---|
| 190926 | X37008.013 | S00_POR | PR | 87SOG2 | 100 | 100 | YY | 80 | - | 100 | 100 | 100 | 90 | 95 |
| 190926 | X37008.013 | S00_POR | PR | 99SOA3 | 85 | 95 | YY | 80 | - | 90 | 90 | 95 | 95 | 95 |
| 190926 | X37008.013 | S00_POR | PR | 89SOA0 | 100 | 100 | YY | 85 | 100 | 90 | 95 | 95 | 95 | 100 |
| 190926 | X37008.013 | S00_POR | PR | 41SOF5 | 60 | 55 | YY | 85 | 85 | 100 | 100 | 100 | 95 | 100 |
| 190926 | X37008.013 | S00_POR | PR | 83SOE0 | 100 | 100 | YY | 90 | - | 100 | 100 | 95 | 95 | 100 |
| 190926 | X37008.013 | S00_POR | PR | 84SOA7 | 100 | 100 | YY | 90 | - | 95 | 100 | 100 | 100 | 95 |
| 190926 | X37008.013 | S00_POR | PR | 88SOD1 | 100 | 100 | YY | 95 | 85 | 100 | 100 | 100 | 95 | 100 |
| 190926 | X37008.013 | S00_POR | PR | 40SOB3 | 100 | 100 | YY | 95 | 65 | 100 | 100 | 100 | 100 | 85 |
| 190926 | X37008.000 | S01_371_Grp | PR | 39SOG1 | 100 | 100 | YY | 80 | 80 | 100 | 100 | 100 | 85 | 95 |
| 190926 | X37008.000 | S01_371_Grp | PR | 86SOC0 | 95 | 95 | YY | 85 | - | 100 | 100 | 100 | 90 | 90 |
| 190926 | X37008.000 | S01_371_Grp | PR | 39SOF5 | 100 | 100 | YY | 85 | - | 100 | 100 | 100 | 85 | 100 |
| 190926 | X37008.000 | S01_371_Grp | PR | 85SOF1 | 100 | 100 | YY | 90 | 85 | 95 | 95 | 100 | 95 | 100 |
| 190926 | X37008.013 | S01_371_Grp | PR | 74SOC3 | 25 | 25 | YY | 90 | - | 100 | 100 | 100 | 100 | 100 |
| 190926 | X37008.000 | S01_371_Grp | PR | 23SOF2 | 100 | 100 | YY | 95 | 90 | 95 | 100 | 100 | 95 | 100 |
| 190926 | X37008.000 | S01_371_Grp | PR | 98SOD4 | 65 | 90 | YY | 95 | - | 100 | 100 | 95 | 100 | 100 |
| 190926 | X37008.013 | S01_371_Grp | PR | 38SOB3 | 100 | 100 | YY | 95 | - | 100 | 100 | 100 | 100 | 100 |

1104 — From 1100

1200 — Like-Unit Cross Lot Groups View

*FIG. 12*

EXPLORATORY DATA INTERFACE

BACKGROUND

The present invention relates to the electrical, electronic, and computer arts, and more specifically, to exploration of dense big data.

Dense big data arises in many contexts. For example, in semiconductor manufacturing processes, each individual die and wafer has thousands of electrical, functional, and logistical parameters. Such voluminous logistical and electrical manufacturing data is difficult to summarize at both an actionable and a high level; too high a summary means only catastrophic problems are visible, whereas too detailed a summary quickly leads to information overload. Where to start an analysis on a problem metric or problem lot is not always obvious, and connecting information across multiple summaries is not easily accomplished. This problem exists wherever there is a high density of information seeking understanding and is not limited to semiconductor manufacturing. It is hoped that expert systems will be able to help handle the flood of dense big data; however, they cannot be trained and validated without human insight into data. This is especially true where there are orders of magnitude more measured variables and logistics than there are manufacturing samples/datapoints. The mismatch between variables and datapoints presents a dimensionality problem.

SUMMARY

Principles of the invention provide techniques for an exploratory data interface. In one aspect, an exemplary method for presenting parametric data includes displaying a first electronic spreadsheet that has a plurality of cells arranged in rows and columns, each row corresponding to a different parameter that is identified in the first column and each cell of each subsequent column displaying a value associated with the parameter identified in the corresponding row; receiving a click on a first cell of the first electronic spreadsheet that displays a parameter identifier of a first parameter; and in response to the click, displaying a second electronic spreadsheet that has a first row of cells displaying values associated with the first parameter and that has at least a second row of cells displaying values of one or more other parameters that are related to the first parameter.

Another exemplary method for production analysis includes receiving production data at a processor from a plurality of tools spatially arranged within a manufacturing facility; creating a hierarchal topology of the data in the processor, wherein each level of the hierarchal topology is based on a different one of a plurality of static parameters that are selected from a list consisting of: a tool identifier, a batch identifier, and a spatial orientation; displaying, at a user interface implemented by the processor, a first analysis of a first level of the hierarchal topology, wherein the analysis contains parameters related to other levels of the hierarchal topology; receiving, via the user interface, a selection by a user of a first parameter displayed on the first analysis; and updating the user interface to display a second analysis of a second level of the hierarchal topology that is related to the first parameter.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Quick navigation of complex structures of parametric production data.

Highlighting the most significant items for review.

Presentation of related avenues for exploration.

Utilization of structural knowledge and relationships between individual units, production lots, electrical data and logistical information.

Ability to jump between alternate views that are centered on the previous object of interest (e.g. lot, parameter).

Presentation of relevant adjacent views and trends to observe temporal continuity between adjacent production lots.

Presentation of relevant correlated or sub-component (delayering) views across parameters and logistics to show commonality and coherent signals.

Utilization of prediction versus actual for yield and parameter modeling to identify if individual measurements appear random or clustered.

Provision of systematic organization and analysis capabilities for a large cross-section of manufacturing data types and topologies.

Automatic creation of logistic-parametric linkages and ability to pivot between them following both manufacturing flows and unit-production adjacency, as well as time-series cross linking.

Ability to retrace steps in a prior analysis based on a stored history of analysis (aka herd-path analysis) and direct link navigation to previously calculated views or analysis (e.g. punch in lot-analysis and pick up where you left off). This allows leveraging historical analysis to arrive more quickly at a hypothesis of root causes for out of range variables.

Creation of snapshot datasets (files, charts, database entries) as a result of the analysis, capturing both the navigational/analysis path and the resultant relevant data views.

Ability of an expert to manually edit/create/delete linkages, set-remove thresholds and predictions, and to override and improve the linkage framework.

Ability of one user to begin an analysis and send the partial analysis track (or analysis bookmark) to another user for further analysis.

Ability to tie in to specific-purpose software tool, such as extant data/visualization/dashboard systems, control systems for manufacturing tools, control systems for inventory/asset location tracking, etc. and dial into these systems with parametrized queries/autofill forms (e.g., jump 3 screens in to the particular trend or parameter of interest).

Ability to mine external specific-purpose software linkages from source data shared with the external software so that the interface to such software can be specified in much the same way the internal linkages of data are specified.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 5-14 present in a schematic a more detailed view of FIG. 4;

DETAILED DESCRIPTION

Figure 1:
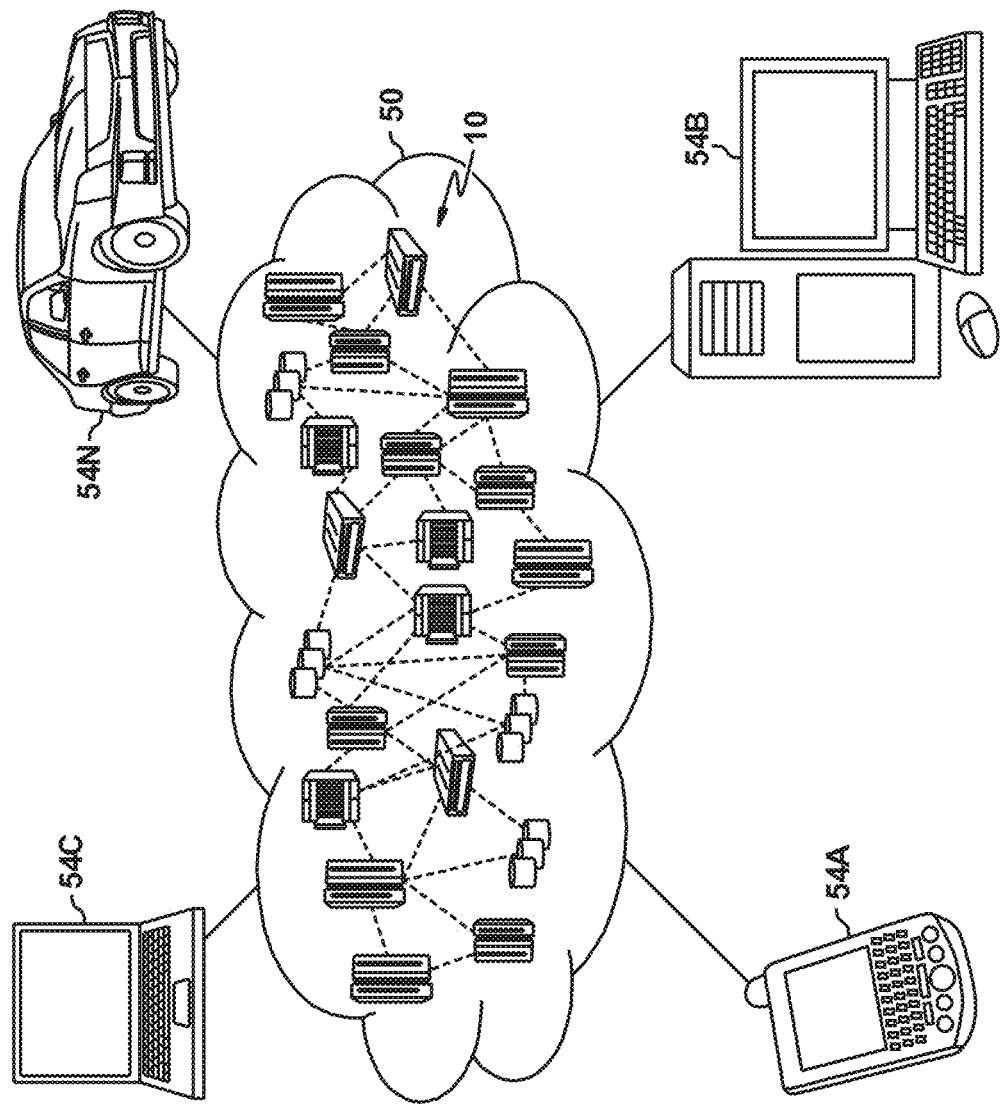
FIG. 1 depicts a cloud computing environment according to an embodiment of the present invention.

In view of the background concerns discussed above, one or more embodiments advantageously provide effective exploratory data analysis (EDA) tools with relevant information design paradigms. In EDA, insight is gained by exploring data and generating ad-hoc hypotheses that later can be tested more rigorously with big data methodologies or validated through physical analysis. An exemplary user interface for EDA is advantageously capable of quickly navigating data structures and jumping between different types and levels of abstraction. Quickly presenting contextually relevant choices for navigation reduces information overload.

EDA can be implemented in standalone computer systems, but most often due to the massive volumes of data being explored it is helpful to use a scalable cloud computing system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
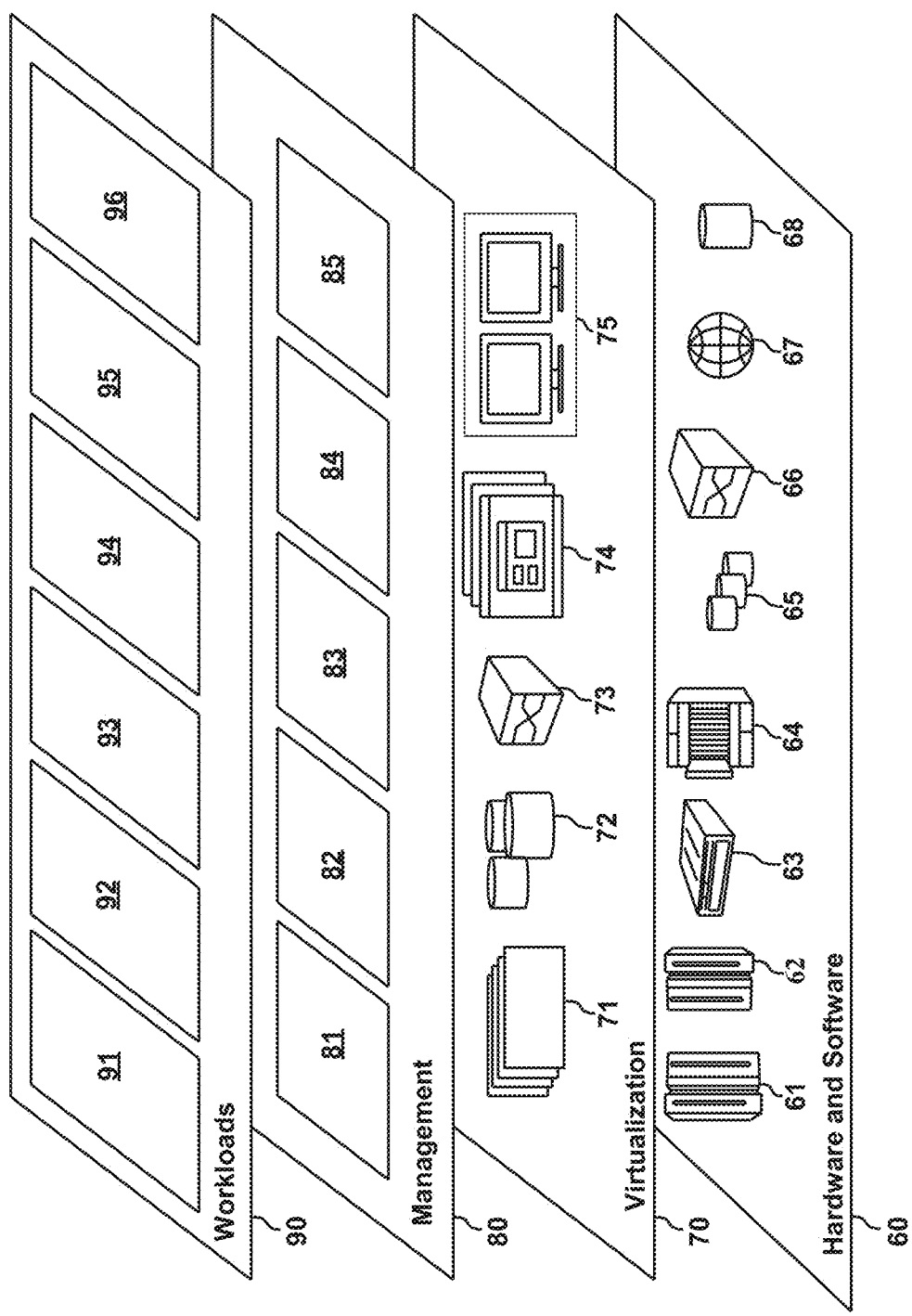
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an exploratory data interface ("EDI") 96.

As discussed in the background section above, the inherent problems of big data analysis for manufacturing process control cannot be trivially solved by conventional machine learning or expert system methodology. The reason for this is typically called "the curse of dimensionality", essentially having many more potential measurements and facets for analysis than exist unique samples from which these measures are drawn, causing classical statistical and machine learning frameworks to break down. In addition to many measurable process variables such as test voltages, layer thicknesses, etc., modern manufacturing also presents huge amount of logistical data, e.g., which tool of a number of identical tools, length of queue times (how long sitting between processes), number of reworks. This is applicable to all multi-step manufacturing processes and not limited to semiconductor manufacturing. The logistical data is both an organizing tool and a subject of analysis itself. One or more embodiments provide a quickly navigable and contextually relevant data display that leverages logistical data and human expert technical insight for the exploration and analysis of manufacturing problems.

Figure 4:
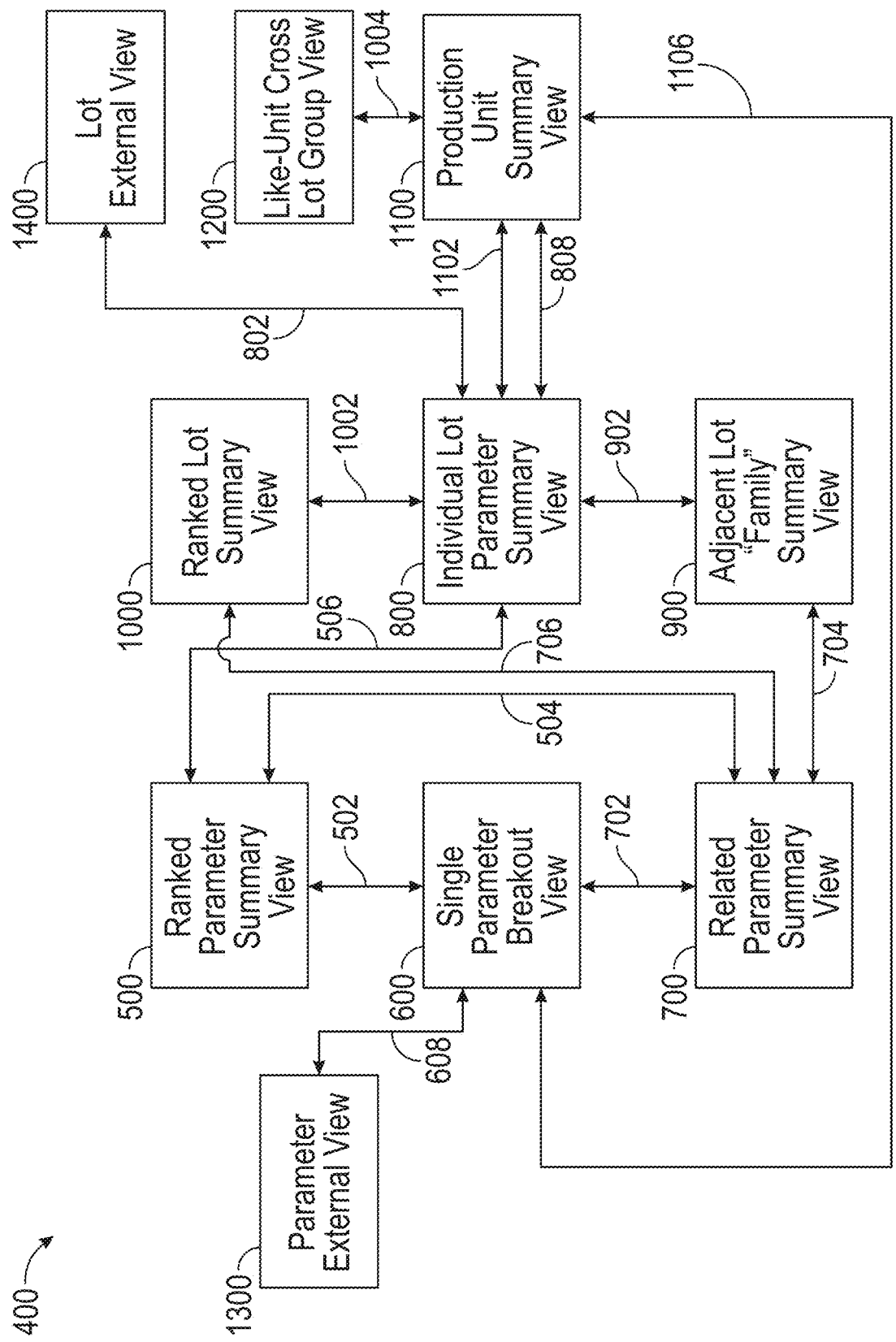
FIG. 4 depicts in a schematic relational navigation paths between different views provided by the EDI.
Figure 5:
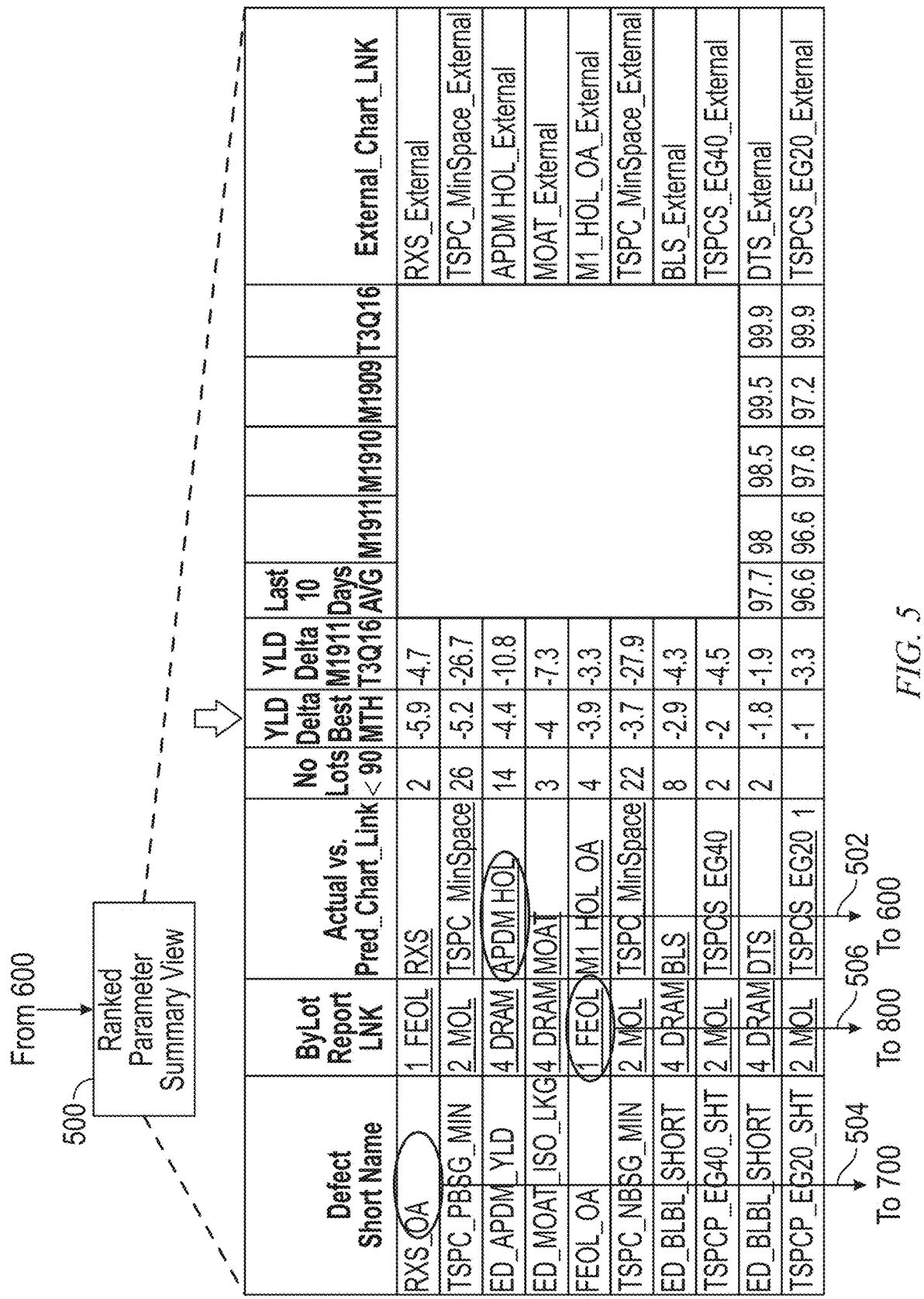
Figure 6:
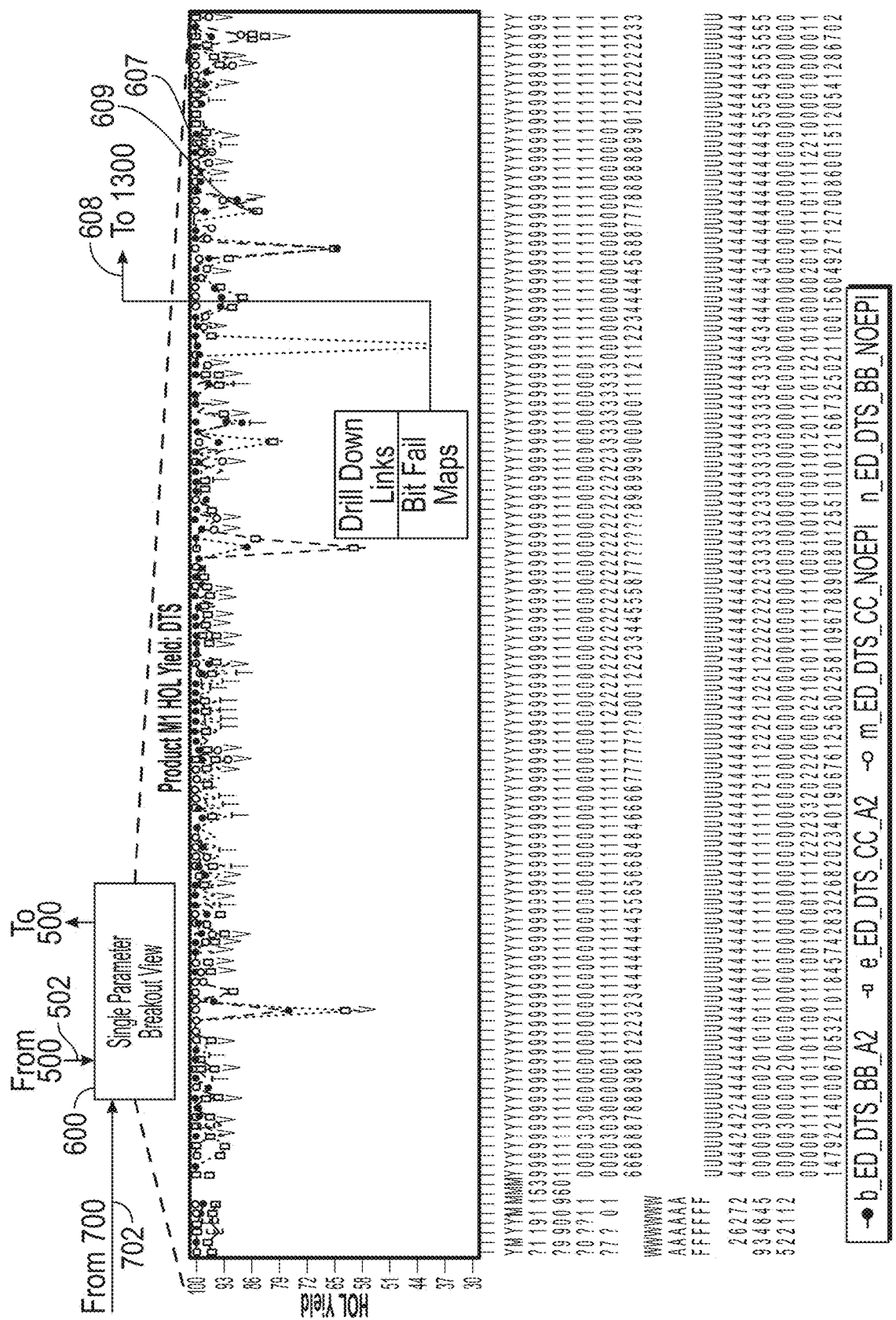
Figure 7:
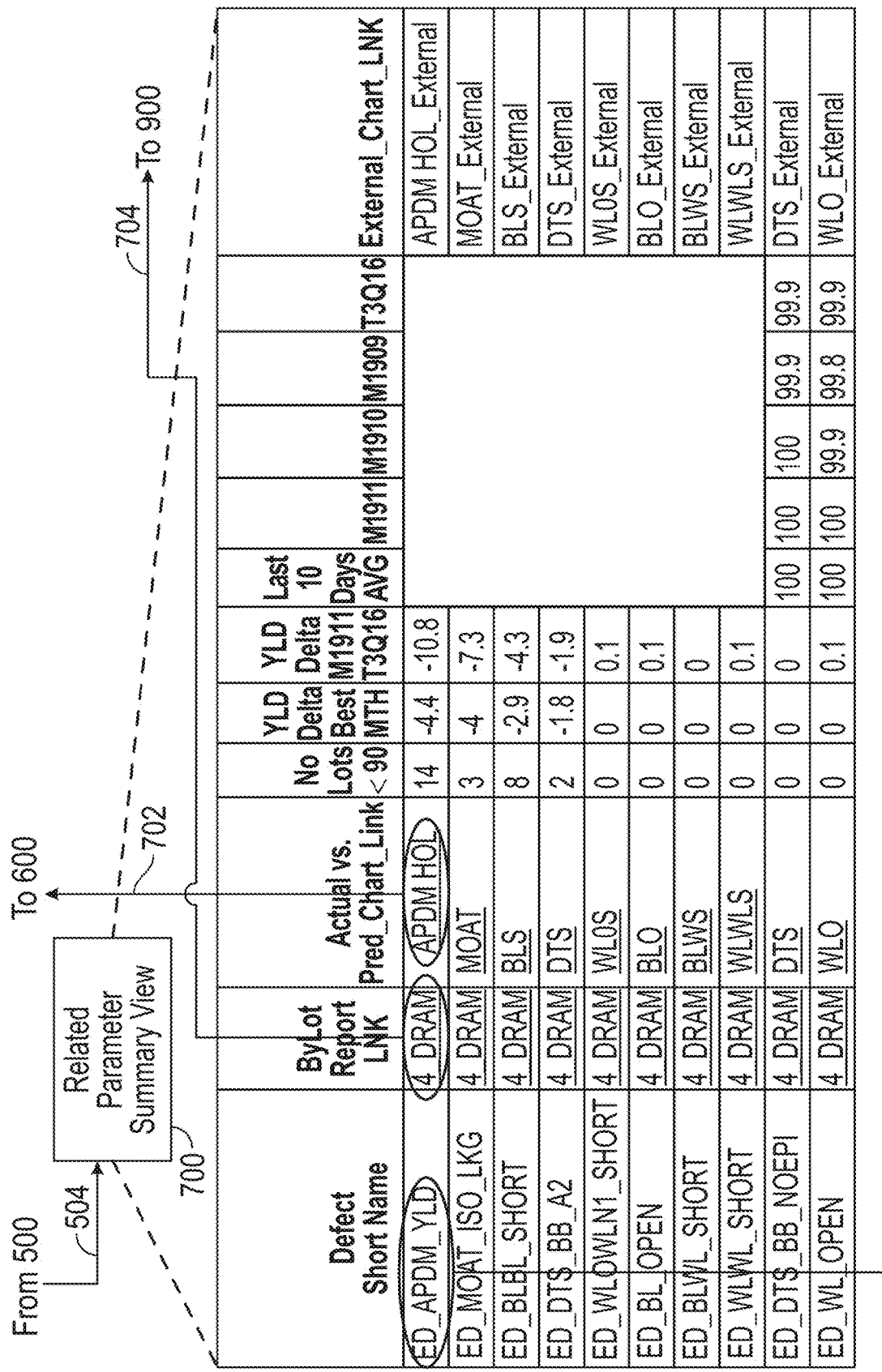
Figure 8:
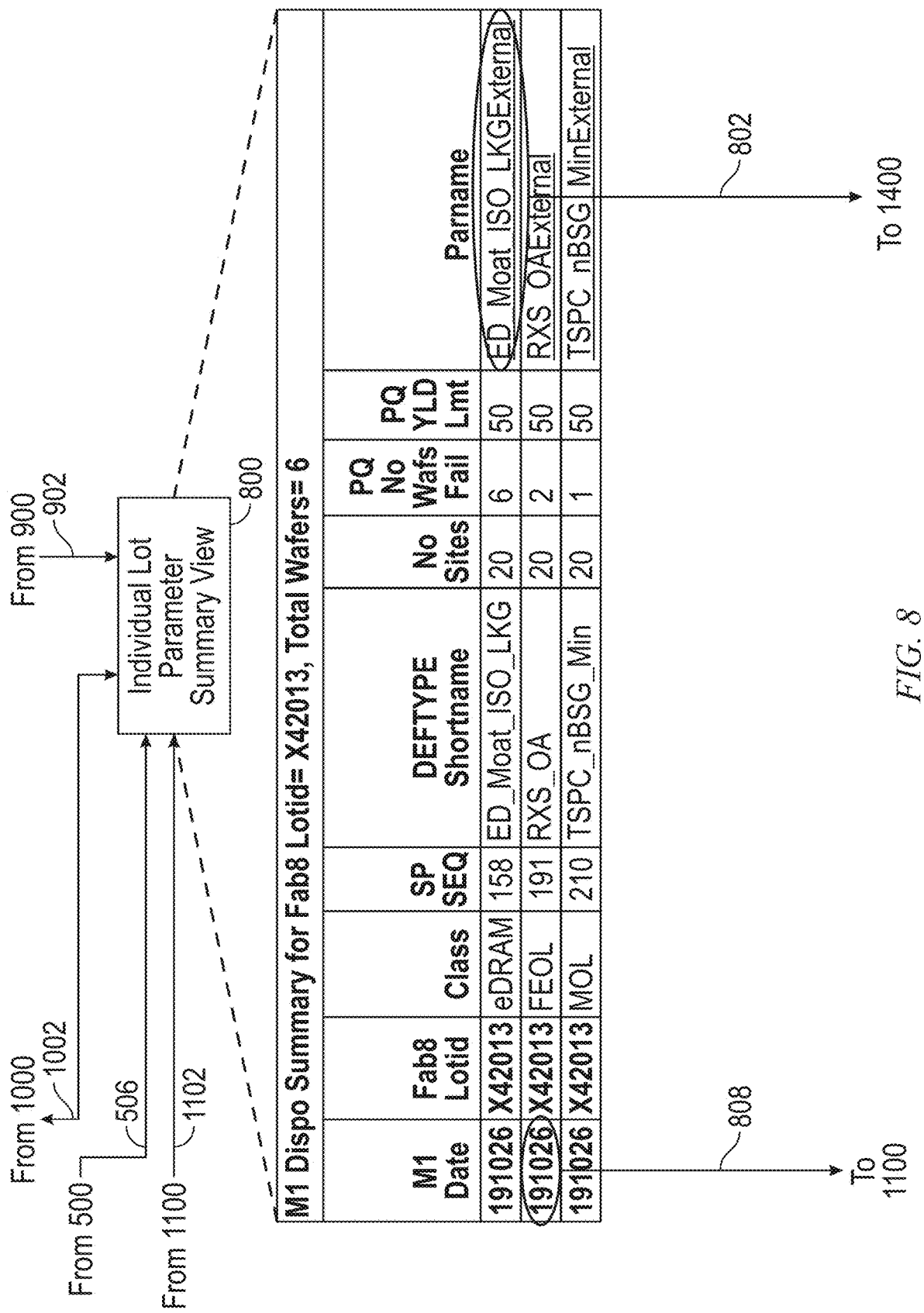

Continuing to view FIG. 2, and briefly considering also FIG. 4 (discussed in greater detail below), at a high view, the EDI 96 provides a contextual view of the dense big data, which highlights the most significant items for review and presents related avenues for exploration. The EDI 96 enables navigation of big data based on experts' structural knowledge of relationships between individual units, production lots, electrical data and logistical information. As shown in FIG. 4, a data reviewer can use the EDI 96 to jump between alternate views (e.g., 500, 600, 700, 800, 900, 1000, 1100, 1200) that are centered on a previous object of interest (e.g., lot or parameter). The EDI 96 presents relevant adjacent views and trends to observe temporal continuity between adjacent production lots. The EDI 96 also presents relevant correlated or sub-component (delayering) views across parameters and logistics to show commonality and coherent signals. In one or more embodiments, the EDI 96 displays predicted yield versus actual yield and can also use parameter modeling to detect measurements that fall outside a normal distribution of values that would be generated by random variations in the underlying process parameters.

Parameter modeling is useful because physics describes basic reactions that follow expected models, e.g., Poisson model, which can be both spatial (e.g., particle/defect location, yield/fault locations) or temporal (e.g., incidence of failure in random sampled test). Many of the models for specific parameters or processes can be derived from first principles. Test constraints can be developed based on models from layout software, e.g. Cadence, pSpice, and/or other electrical-physical modeling software. These software programs suggest in-spec or out of spec outcomes based on designs and then the ultimate manufacturing process decides which parameters to test. The EDI 96 presents both visuals and relevant metrics to validate signals. In addition, more complex clustering methods (e.g. k-means, graph connectedness) can be employed to generate review cases via cluster coherence and cluster separability measures.

Figure 3:
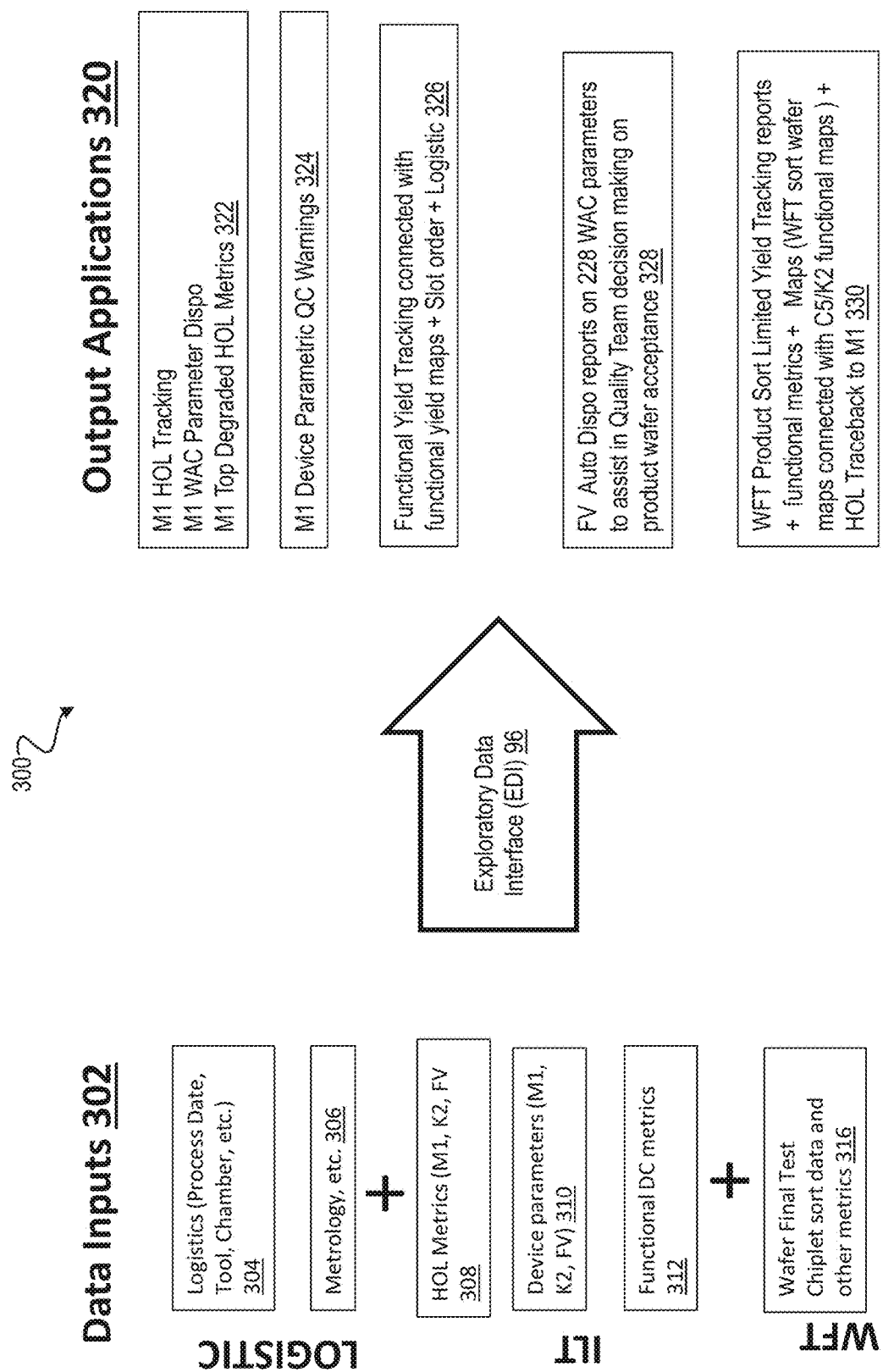
FIG. 3 depicts in a schematic a data flow of an exploratory data interface (EDI) according to an exemplary embodiment.

FIG. 3 depicts in a schematic a data flow 300 through the EDI 96, according to an exemplary embodiment. Inputs 302 include, by way of example, logistics 304, metrology 306, Health of Line (HOL) metrics 308, device parameters 310 measured at the first layer of metal wiring, functional DC metrics 312 produced by measurements on kerf structures, and wafer final test and chiplet sort data 316.

HOL metrics often are summary parameters of tens to hundreds of yield measures, physical measurements, and other threshold quantities meant to represent the relative health or value of the current process, irrespective of the current production units (e.g., how consistent is a specific lithographic process). For example, constituent parameters for a single HOL metric could include any of resistance, capacitance, material thickness/critical dimension, functional macro, or kerf structure logical pass/fail. These measures are expressed as statistical yields, i.e. what fraction of production units have satisfactory values for each parameter. The combination of yields can be multiplicative so that if there are three constituent parameters with 100% yield and one parameter with 80% yield, the HOL metric is 80%. This can also be accomplished by specific test sites with many specific structures meant to gauge the process via electrical, optical or other readout. A specific example of an HOL metric is TS-PC min space, which is measured by a four structure test site with slightly shifted geometries across all four structures, measuring the resistance on all structures and seeing which have shorts or resistive shorts. This structure could be affected by spacing (i.e. alignment and material thickness) or defect issues, and as such, it is valuable to have other measures and types of tests to help interpret it and put it in context. Such measures are similar to kerf/device parameters which are typically interpreted in the context of the health of the individual production unit rather than the health of the process. Sometimes a parameter/test site can be used for both Health of Line and health/yield of individual product.

When building any structure, transistor or otherwise, it is possible to measure the resistance between any two nodes in a circuit. Objectively this can be measured in ohms going from zero (two things wired together perfectly) to essentially infinity (perfectly insulated). For more casual terminology, thresholds are used to categorize resistance measures. For things that should regularly be well connected/wired together, there may be opens (extremely high resistance) or resistive opens (higher resistance than would be if the connecting wire/interface was formed correctly). Conversely when things aren't supposed to be connected, there may be shorts (extremely low to zero resistance when things should not be connected) or resistive shorts (there is moderate resistance/insulation between two points, but not enough for operation or performance). For example, resistive shorts could come from a poorly formed insulating layer that allows some marginal metal contact, or perhaps a piece of debris/defect bridging two metal surfaces. Sometimes these are quantified by a set of thresholds, e.g. the connection is more than 10 ohms but less than 20, 100 or 1000 ohms. One example of a resistive short could exist between inputs and outputs of a transistor, e.g., between the gate, source, and/or drain.

Direct current or analog (DC) metrics are a subset of all potential measurements. DC typically means opens, shorts, and resistance measures. These can be converted into yields via thresholds (e.g. a power supply wire should have a resistance lower than 5 ohms). In this context, "DC" can include logical circuits operated at very low speed, e.g. 2-3 orders of magnitude slower than operating frequencies of the product, as to avoid analog/AC circuit interactions. As an example, running small pieces of logic at the MHz range when the chip is designed for GHz operation. As mentioned, analog metrics often are measured at kerf structures. Kerf structures can be simple layouts, basic circuits (e.g., ring oscillator), or even complex structures that mimic portions of the chip, e.g., EDRAM or SRAM arrays, functional units, etc. The specific test conducted on the kerf structure is driven by its design. In addition, often there are digital or alternating current (AC) measurements that are taken "at speed" using alternating current below, at, or above the operating frequency of the semiconductor chip.

Outputs 320 include, by way of example, ranked listings of parameters that are out-of-range or of manufactured articles or tools that have out-of-range parameters.

The EDI 96 processes the inputs 302 to produce the outputs 320. For example, the outputs 320 include a listing 322 of top HOL degraded indicator warnings based on current monthly yield vs. best month yield. Such a listing advantageously enables users to quickly identify out-of-control HOL indicators. The EDI 96 also produces device-level parametric quality control warnings 324, yield trend charts 326, and drill-down web reports 328, down to wafer level. The parametric quality control warnings 324 can be generated in response to comparing process tool instrument readings to control limits, or by calculating a multivariate statistic based on more than one process tool instrument reading and comparing the multivariate statistic to control limits. The yield trend charts 326 plot wafer or other product yield quantity against time or production line. The web reports 328 present measured data and calculated statistics in tabular format with links on particular table cells that open other tables presenting different perspectives on the data and statistics. The web reports 328 are discussed in further detail with reference to FIGS. 4 and 5-14. As another example, the outputs 320 include quality control (QC) Reports 330 with warning flags for all M1 device parameters. The QC Flags include out of control lots, mean shift warnings and degree of shifting. In one or more embodiments, QC warning statistics are based on the last 21 lots tested within the last 20 days; other embodiments can use different numbers of lots and different test periods. In one or more embodiments the outputs 320 also include various quality control statistics for tool performance, variability contribution statistics from lot to lot, wafer to wafer, etc. as well as quality control (QC) charts (mean & standard deviation), Process Capability Index (CPK) charts, and by-zone trend charts. All these outputs can be presented via the web reports 328.

It will be appreciated by the skilled worker that the web reports 328 could be, in some aspects, spreadsheets implemented via HTML, XML, or similar format that permits clicking on a cell of a first spreadsheet in order to open a second spreadsheet with data related but not identical to the first spreadsheet. A spreadsheet is an interactive computer application for organization, analysis and storage of data in tabular form. Spreadsheet programs were developed as computerized analogs of paper accounting worksheets. Such programs operate on data entered in cells of a table. Each cell may contain either numeric or text data, or the results of formulas that automatically calculate and display a value based on the contents of other cells. A spreadsheet also may refer to the electronic table in which the data is entered and represented. Providing spreadsheets that link to each other, in the nature of the web reports 328 that are presented by the EDI 96, permits a user to navigate through the data of the spreadsheets in an intuitive fashion where each click reveals additional information that is relevant to the data just clicked upon. Further, HTML/XML display interfaces can provide a history of clicked links so that it is possible to navigate back from a given display to preceding displays, thereby retracing the steps of a data inquiry to enable reassessment of the investigator's approach and insights. Given the teachings herein, the skilled artisan will be able to construct spreadsheets and user interfaces in accordance with aspects of the invention. The exemplary EDI 96 groups parameters in its various views: by tool; by production unit; by time stamp. The exemplary EDI 96 uses parameter modeling to identify out of range values, and to predict forward the possibility of out of range values based on earlier weak indicators.

FIG. 4 depicts in a schematic 400 relational navigation paths between different views provided by the EDI 96. The views include a ranked parameter summary view 500, a single parameter breakout view 600, a related parameter summary view 700, an individual lot parameter summary view 800, an adjacent lot "family" summary view 900, a ranked lot summary view 1000, a production unit summary view 1100, a like-unit cross lot groups view 1200, a parameter external view 1300, and a lot external view 1400. FIGS. 5-14 show the same schematic 400 with greater detail on the various views.

As depicted in FIGS. 4 and 5-14, it is possible to navigate between the various views by links embedded in each view. The ranked parameter summary view 500 (shown in more detail in FIG. 5) has link 502 to single parameter breakout view 600 (shown in more detail in FIG. 6), link 504 to related parameter summary view 700 (shown in more detail in FIG. 7), and link 506 to individual lot parameter summary view 800 (shown in more detail in FIG. 8). The single parameter breakout view 600 has a link 608 to parameter external view 1300 (shown in more detail in FIG. 13). The related parameter summary view 700 has link 702 to the single parameter breakout view 600, link 704 to adjacent lot "family" summary view 900 (shown in more detail in FIG. 9), and link 706 to ranked lot summary view 1000 (shown in more detail in FIG. 10). The individual lot parameter summary view 800 has link 802 to lot external view 1400 (shown in more detail in FIG. 14) and link 808 to production unit summary view 1100 (shown in more detail in FIG. 11). The adjacent lot "family" summary view 900 has link 902 to the individual lot parameter summary view 800. The ranked lot summary view 1000 has link 1002 to the individual lot parameter summary view 800. The production unit summary view 1100 has link 1102 to the individual lot parameter summary view 800, link 1104 to like-unit cross lot grouping 1200 (shown in more detail in FIG. 12), and link 1106 back to the single parameter breakout view 600. Each of these links can be reversed using a browser "back" button in a manner familiar to the ordinary skilled worker.

The ranked parameter summary view 500 (shown in FIG. 5) shows all parameters, ranked by significance. The ranked parameter summary view 500 displays parameters that are out of range, for further investigation. Significance can be a simple measure such as out-of-sigma count (i.e. number of parameters outside one standard deviation from a mean value), p-value (as defined by a population split), impact factor (e.g. high deviations are known to have high impact) or other metric. The ranks can form a traffic-light or similar color code chart. The ranked parameter summary view 500 could also be considered as a Pareto view. Within the ranked parameter summary view 500, each parameter value has a corresponding link 502 to a single parameter breakout view 600, which is a time series view of that parameter. Thus, the EDI 96 can intuitively pivot from monthly Pareto to specific time series. The single parameter breakout view 600 also displays modeled expectations for the parameter for comparison to the actual measured values. Each parameter identifier has a corresponding link 504 to a related parameter summary view 700 that shows a family of parameters that all are related to the parameter identifier originating the link. Thus, the EDI 96 can intuitively pivot from a view showing singular out of range values to a view showing context for those values.

An exemplary single parameter breakout view 600 (shown in FIG. 6) is a graph of a parameter by production lots, including an actual value 607 and a predicted outcome (modeled expectation) 609 for the parameter. The single parameter breakout view 600 enables random/systematic behavior testing, A/B or Factorial Experiment testing (p-value, ANOVA, etc.). An expert reviewing the view 600 can ascertain whether a parameter out of range is confined to a single production lot (potential problem with production units or temporary tool or system problem) or is spread across multiple lots (persistent problem with system or tool). Links 602, 604, 606, 608 provide navigation to the ranked parameter summary view 500, the related parameter summary view 700, the individual lot parameter summary view 800, or the parameter external view 1300, respectively.

The related parameter summary view 700 of the EDI 96 (shown in FIG. 7) displays parameters that share the same production sector (e.g., all Middle of Line parameters). The parameters can be displayed in summary or by a group-of-lots listing. The related parameter summary view 700 also displays correlations across adjacent parameters.

The individual lot parameter summary view (by-lot view) 800 of the EDI 96 (shown in FIG. 8) displays various metrics for each product in a group of production lots. For example, a production lot may be a group of wafers that are moved through a production clean room in a common carrier and are subjected to each production process together. The by-lot view 800 highlights specific parameters for which a production lot has been flagged (short report) or provides a readout of all parameters for the lot (long report). A viewer can toggle between the short report or the long report.

In the adjacent lot "family" summary view 900 of the EDI 96 (shown in FIG. 9), each of a plurality of manufacturing lots has a corresponding link 902 to the by-lot view 800. Alongside each link are shown values of various parameters corresponding to each lot. The plurality of manufacturing lots in the family are similar production lots according to at least one of time, parametric space, tool commonality, etc.

The ranked lot summary view 1000 (shown in FIG. 10) presents the most significant lots for review based on highlighting mechanics such as, by way of a non-limiting example, parameter deltas from target values. It is generated in response to a click on the related parameter summary view 700. The large arrow on view 1000 indicates by what parameter the lot is ranked (what parameter was clicked on view 700).

The production unit summary view 1100 (shown in FIG. 5H) displays metrics for individual production unit parameter excursion within a lot. The production unit summary view 1100 includes a display of tool/chamber/handler history (e.g., history of defects or history of production wafers), and also includes links 1102, 1104, 1106 to the individual lot parameter summary view 800, a similar (like-unit) production units view 1200 (production unit family is not lot family—idea is similarity), and the single parameter break-out view 600.

The like-unit cross lot groups view 1200 (shown in FIG. 12) presents parameters for production units that have similar out-of-range parameter values.

The parameter external view 1300 (shown in FIG. 13) presents bit fail maps that display where in a group of production lots the selected parameter has failed its threshold value.

The lot external view 1400 (shown in FIG. 14) presents a graph of product yield metric in relation to production lot, date, and time.

Figure 15:
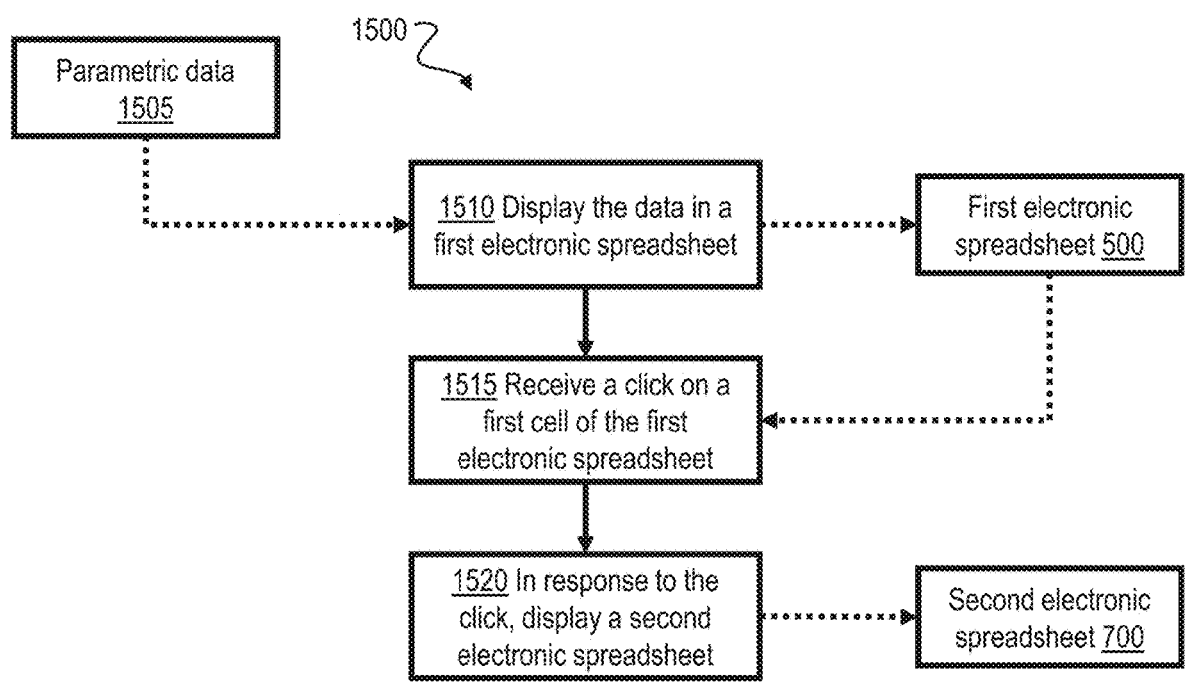
FIG. 15 depicts in a flowchart a method implemented by the EDI.

FIG. 15 depicts in a flowchart a method 1500 that is performed by the EDI 96. The method 1500 is for displaying parametric data 1505 via a sequence of electronic spreadsheets and charts (i.e. the various views 500, 600, 700, 800, 900, 1000, 1100, 1200, 1300, 1400) that are linked to each other. The method 1500 includes the following steps. At 1510, display the data 1505 in a first electronic spreadsheet (e.g., 500) that has a plurality of cells arranged in rows and columns. Each row corresponds to a different parameter that is identified in the first column (note that "first," "second," and "subsequent" are arbitrary identifiers, so that a "first" column is not necessarily the leftmost column and a "first" row is not necessarily the topmost row, while a "second" row or column is not necessarily adjacent to a "first" row or column) and each cell of each subsequent column displays a value associated with the parameter identified in the corresponding row. At 1515, receive a click on a first cell of the first electronic spreadsheet that displays a parameter identifier of a first parameter. At 1520, in response to the click, display a second electronic spreadsheet (e.g., 700) that has a first row of cells displaying values associated with the first parameter and that has at least a second row of cells displaying values of one or more other parameters that are related to the first parameter.

Figure 16:
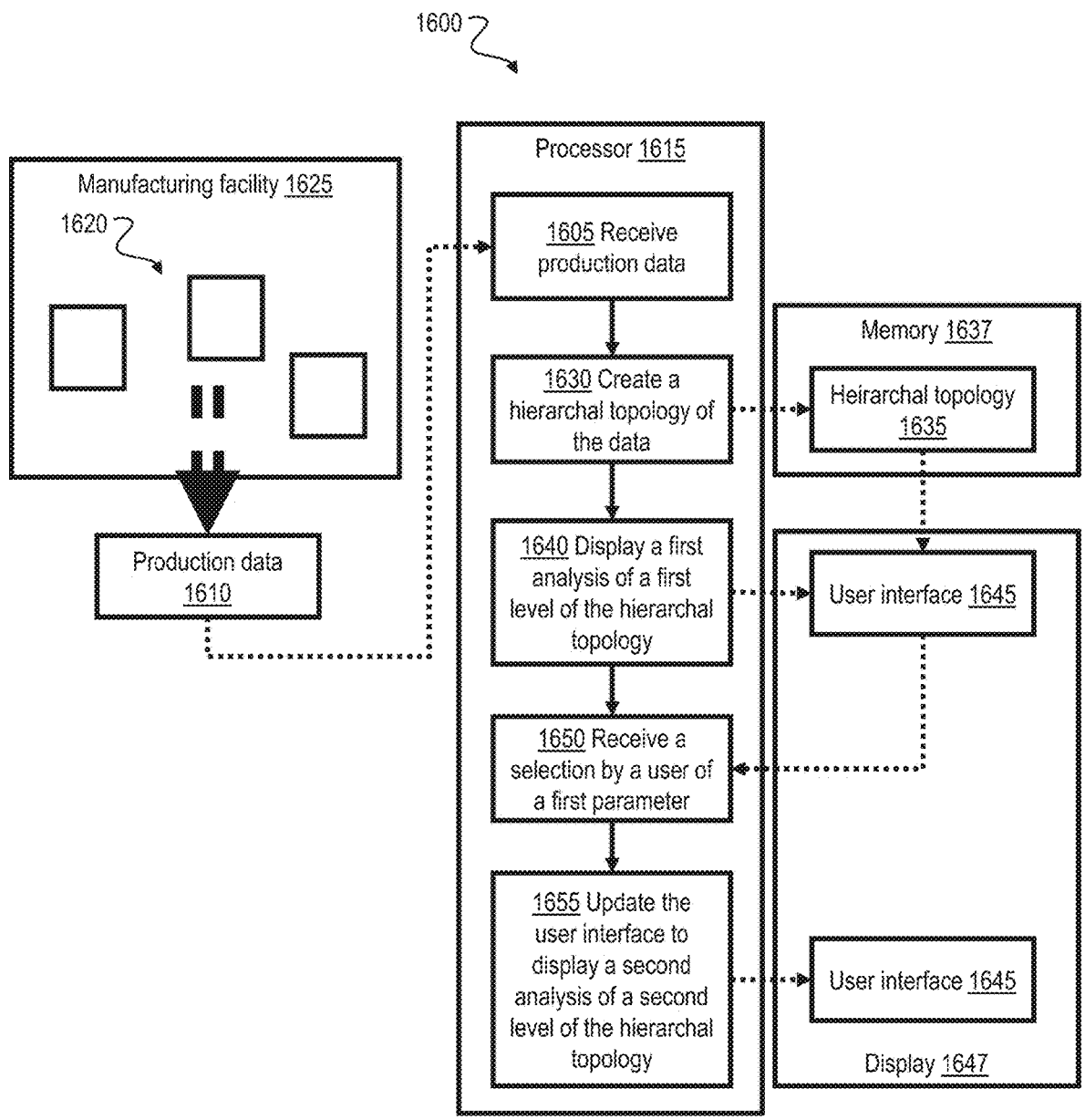
FIG. 16 depicts in a flowchart another method implemented by the EDI.

FIG. 16 depicts in a flowchart another method 1600 that is performed by the EDI 96. The method 1600 is for production data analysis. The method 1600 includes, at 1605, receiving production data 1610 at a processor 1615 from a plurality of tools 1620 that are spatially arranged within a manufacturing facility 1625. Then at 1630, create a hierarchal topology 1635 of the data 1610 in a memory 1637 that is connected in communication with the processor 1615. Each level of the hierarchal topology 1635 is based on a different one of a plurality of static parameters that are selected from a list consisting of: a tool identifier, a batch identifier, and a spatial orientation. In one or more embodiments, "spatial" orientation is meant to be sequential, e.g., in terms of which one of a batch of workpieces was processed in which order, or which set of tools the batch was routed through. Sequential adjacency can be inferred from timestamps. In one or more embodiments, "spatial" orientation can refer to which subcomponents of a tool processed a wafer (e.g., tool A chamber 3 left carousel). At 1640, display, at a user interface 1645 that is implemented by the processor 1615 via a display 1647 that is coupled in communication with the processor, a first analysis of a first level of the hierarchal topology 1635. The analysis contains parameters related to other levels of the hierarchal topology 1635. At 1650, receive, via the user interface 1645, a selection by a user of a first parameter displayed on the first analysis. Then at 1655, update the user interface 1645 to display a second analysis of a second level of the hierarchal topology that is related to the first parameter.

Thus, in one or more embodiments, the EDI 96 provides systematic organization and analysis capabilities for a large cross-section of manufacturing data types and topologies. For example, the EDI 96 provides a starting point for a variety of analyses, either starting with a problem tool or problem production lot, for example, and offers a pathway to quickly explore context.

For example, in one or more embodiments, the EDI 96 provides a system that includes a series of interconnected data views of parametric, logistic, and production-unit views, utilizing inherent data structures native to manufacturing and logistics, creating data display groups based on adjacency and inherent gathering of information native to the manufacturing process, and utilizing a production database containing logistical information in the form of tool handling data, production lot data, and parametric data extracted during the production sequence. In one or more embodiments, the EDI 96 also provides an exploratory data system navigated by adjacent links and allowing shifts of context between adjacent links as defined by inherent production logistics such as adjacent lots, adjacent measures in the same sector, adjacent sectors spatially or temporally. Additionally, in one or more embodiments the EDI 96 allows shifts of context as user specified related parameters in a family (e.g. HOL or device parameters), or from a central focus on a production lot (many measures), a production metric (many lots), or a production sector (many lots or many measurements).

In one or more embodiments, the EDI 96 provides a navigational sequence for exploratory data analysis, with the navigational links populated by the logistical structure of the manufacturing process. Links can be made or broken by further user actions on the system (e.g., definition of a favorite dashboard). The EDI 96 can set up links to external data systems or sources that are not implied in the core logistic-parametric-lot database.

In one or more embodiments, the EDI 96 enables initiation of analysis by a trigger on a production lot, production parameter, or a production sector, or production tool, and specifies analysis at a particular view. A production lot trigger can be a statistical trigger (p value or more complex statistical rule or rule set), or a user specified trigger (hard threshold or combination of rules). Following a link through to the triggered parameter provides a particular view focus and brings adjacent context links into focus. Following the link to the trigger at a specified view also displays lesser rank triggers relevant to that view. Triggers are ranked according to a triage process. For example, triage is used in order to chase a new failure mode causing yield degradation. First, for a set of production units, say lots processed in the past 120 days, identify impacted lots due to known yield detractors. Second, exclude those impacted lots in the past 120-day production units. Third, based on this scrubbed production units (i.e. lots list/dataset), use datamining to discover a new failure mode. Finally, continue to verify the signal of the new failure mode through new processed production units and submit a Physical Failure Analysis (PFA) sample to confirm the defects and actual mechanism. Based on these learnings, incorporate the valuable information (e.g. confirmed yield detractors) into the EDI 96 to increase efficiency of the users who analyze the big manufacturing data. Thus, following triage item #1 will also highlight triage rank items #23 and #57 since they are tied to the same view.

In one or more embodiments, the EDI 96 renders a view or focus with adjacent context links, and related statistical flags, and focus shifting links. Within a view, the EDI 96 provides a detailed readout on the specified focus. For example, a lot view includes all lot members and lot-relevant metrics; a parameter view lists related parameters and linked sectors; a sector-lot view lists all lots through sector with summary metrics; and a sector-parameter view list all parameters extracted or relevant to sector. Adjacent context links provided by the EDI 96 in association with a view include a lot view such as one lot to other temporally adjacent lots with the same information (tool or metric); a sector view such as one sector to spatially or sequentially adjacent sector with the same lot or metric data; a parameter view such as one parameter to other sequentially gathered or conceptually related parameters. Exemplary focus shifting links provided by the EDI 96 (see FIG. 4) include going from a lot view with a particular parameter specified to that parameter view with that lot and many other lots specified; going from a parameter view with many lots specified to a single lot view with many parameters specified. In one or more embodiments, the EDI 96 provides a data scoping function that limits the amount of data presented such that a view is not overwhelming and that presents triggers, scopes, and derived data from one user to another user when distance or global triage criteria is met. The data scoping function can be informed by degrees of separation from the current view as measured in graph node or navigation link click-throughs; by temporal filtering; or by a cumulative analysis filter. Scoping based on a cumulative analysis filter as defined as thresholds set in a view to limit the data displayed there, and then retained when navigating to subsequent views, with the rendering of the view constrained by the prior specified filters.

Thus, the EDI 96 provides a data interface to quickly navigate and triage data, perform EDA and formulate ad-hoc hypotheses for more structured testing. In one or more embodiments, the EDI 96 utilizes pre-cached and anticipated summaries for fast navigation, so that a user (data reviewer) does not need to wait for every database query to execute in real-time. For example, interface frames (any of the views 500, 600, 700, 800, 900, 1000, 1100, 1200, 1300, 1400) can be rendered in advance based on anticipated filters or recently searched/cached results. Indeed, when regenerating a single view with a new filter, a background process can begin regenerating other views directly linked to the view with the new filter.

The EDI 96 also provides dynamic linkage of multiple views that are contextually relevant, with persistence of global filters and annotation capabilities. In one or more embodiments, the EDI 96 provides persistent global capability across all views to include/exclude data, change visual styles (e.g. quartile bucket colors), add annotation to either parameters or lots, and disposition production assets (i.e. flag a production lot or asset for extraordinary human intervention). That is, in any view, a user may explicitly include or exclude lots, wafers, parametric thresholds, etc. and re-render the view with the new filter. The new filter will globally persist as the user navigates across data views. Also, in any contextual screen the user may add annotations that will be saved as object properties of the annotated parameter, lot, wafer, etc. Thus, the EDI 96 can provide several different filter views on the same data.

For example, in one or more embodiments, the EDI 96 enables a user to trace back and connect all the data at prior test points to troubleshoot root causes of yield issues.

In other words, in one or more embodiments, the EDI 96 is based on a hierarchal topology for organizing dense big data (e.g., semiconductor or other complex manufacturing data) in an ad-hoc interactive interface. In one or more embodiments, the EDI 96 provides a priority listing of problem metrics or signals in a given context (e.g., production lot, sector measurement). For example, the EDI 96 may provide a specialty linked view that navigates across multiple dimensions of manufacturing data, test, and logistics. The EDI 96 also may provide guidance on relevant parameters when changing contexts from test to logistics, lot-to-individual, sector to sector, etc. Part of the EDI 96 functionality includes interspersed cross links in a data table for ease in access of data relevant to an aspect of a selected parameter. In one or more embodiments, the EDI 96 utilizes common global options to pre-render views to aid in quick navigation and cached analysis.

A production database can be considered as a repository for measurements and notes about the measurements. Different tools and engineers will write the notes slightly differently and with slightly different content, but a few basic things could be present on each note: a production unit (lot/wafer), some kind of logistical location (e.g., tool or chamber) and a datetime stamp, and in some cases some form of parametric or yield data for that lot/wafer. The high level boxes in FIG. 4 represent structured queries along these identifiers in the database; in this sense the EDI 96 exploits a natural order found in an otherwise clutter of notes, and presents the notes in a usable format. One of the insights associated with the invention is rather than just providing these stand-alone queries, in which there are hundreds of ways to visualize the data, the relevant pivot queries are presented adjacent to the current dimension being explored via a link (e.g., if looking at a parameter time series now, there is a link to next look at other parameters of a lot selected from the parameter time series). In this sense, the system constrains and guides the exploration of the data via the naturally extant logistical boundaries of both production sequence, and spatial/temporal adjacency. This eliminates a near infinite combination of potential views that could not only be wrong, but could present reverse causality or other unhelpful but statistically valid views (e.g. wet pavement causes rain) because logistical sequence is ignored in blind datamining.

Figure 9:
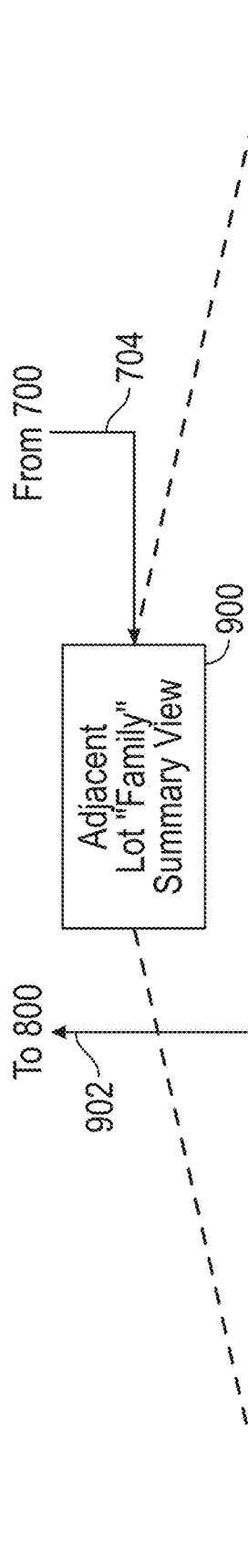
Figure 11:
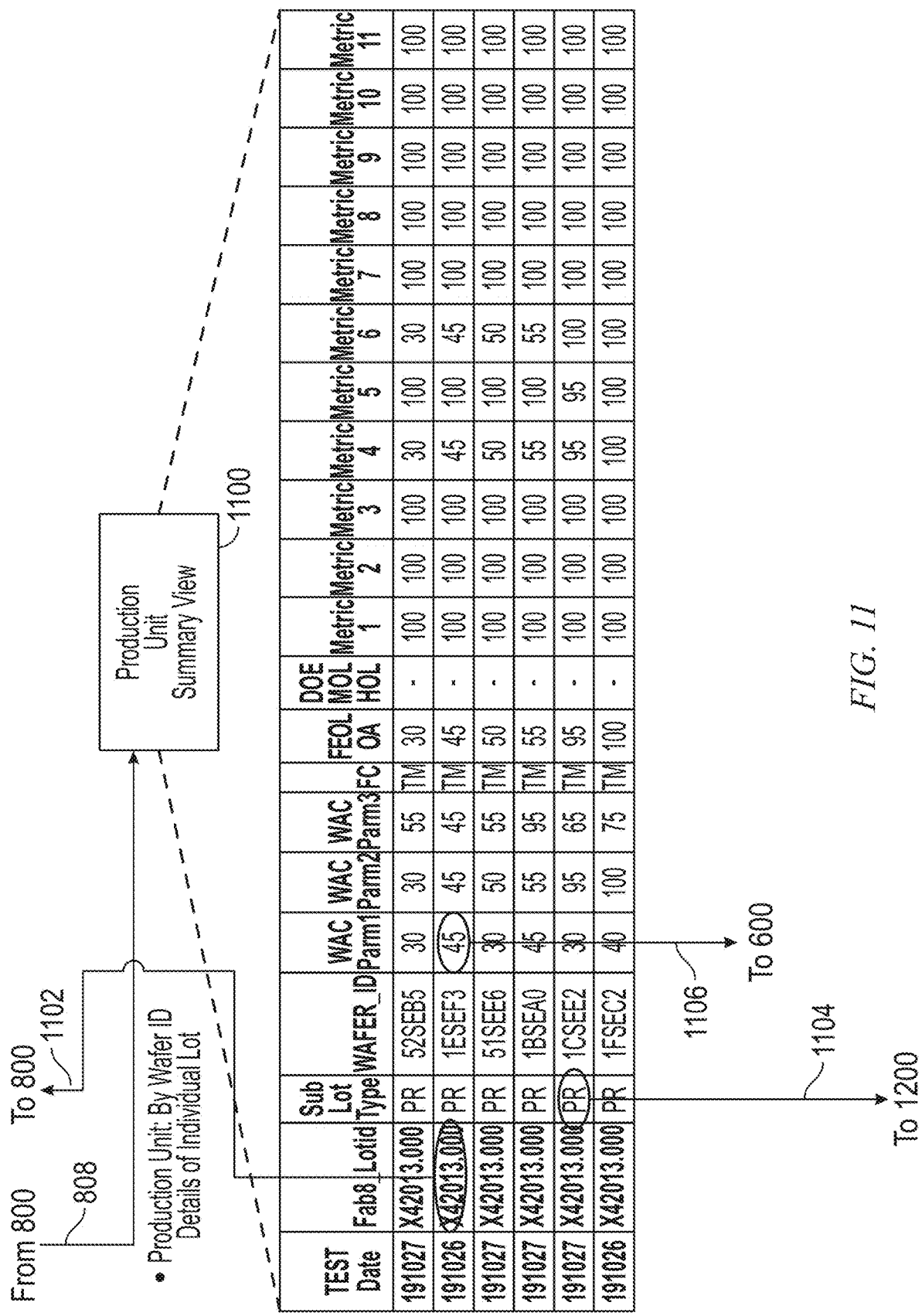
Figure 13:
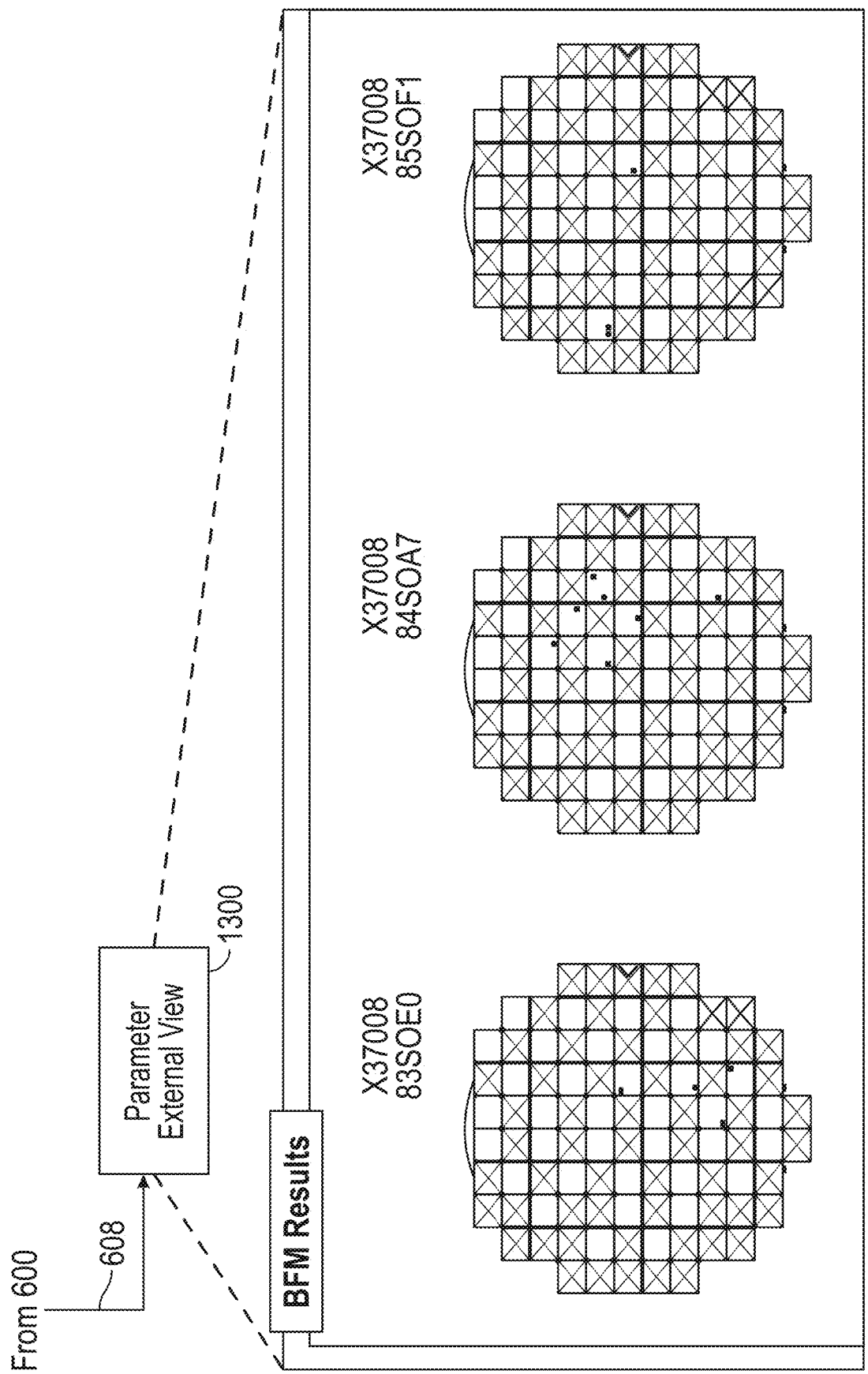
Figure 14:
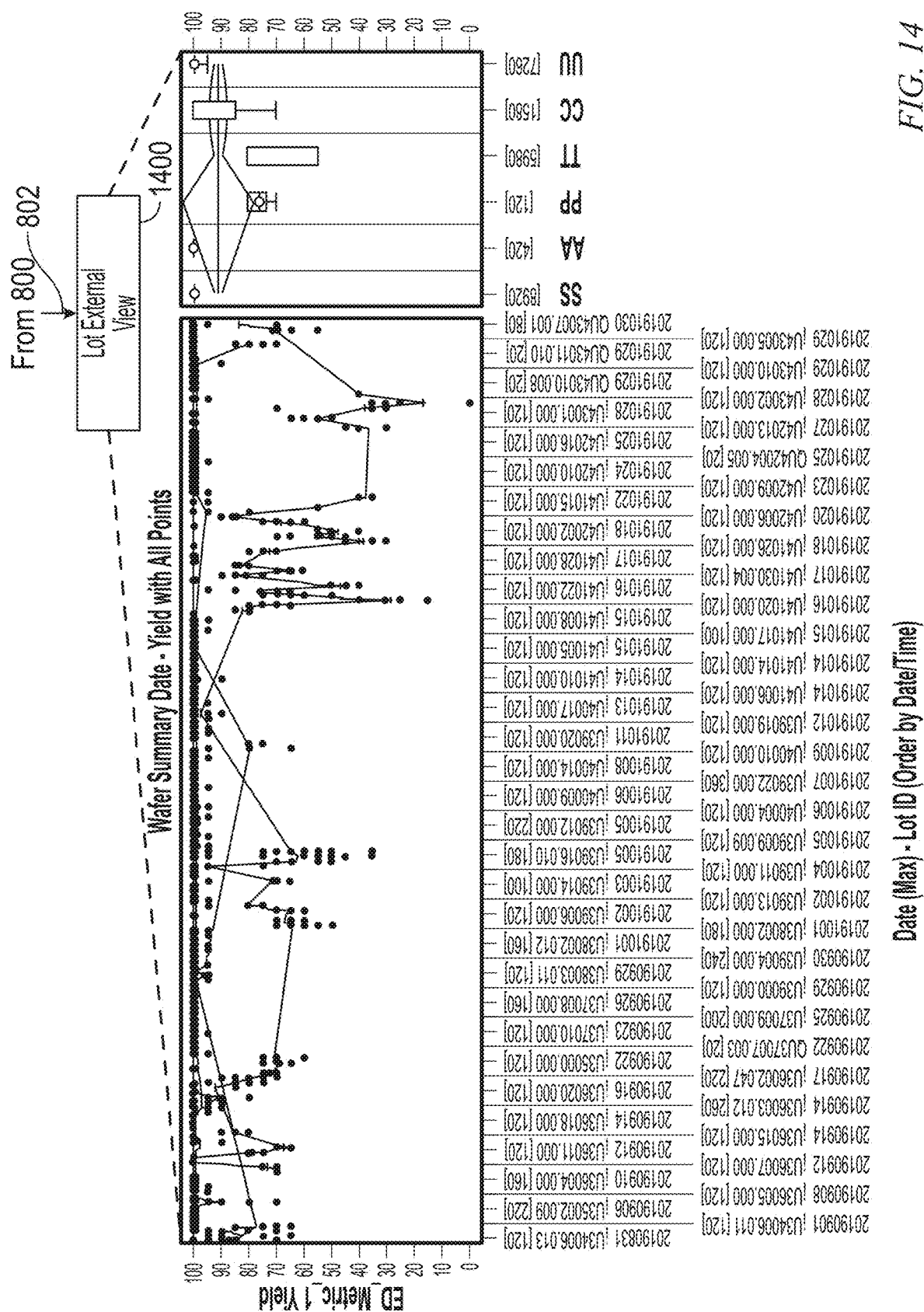

By focusing on an individual lot, the EDI 96 can render temporally adjacent or parametrically adjacent, or tool-fleet adjacent lots (many variations on view 900, shown in FIG. 9). Similarly, rather than traversing along lots, the EDI 96 can focus on a measure for a lot, and look at related parameters (view 700, shown in FIG. 7). Relationships can be automatically extracted in the logistical sequence (the system knows which wafers were processed where and when); this type of information can be queried iteratively or in a one-shot sequence. Parametric groups can be further derived from logistical groups (e.g. this group of parameters is measured at the same spot in the logistical sequence). Parametric groups can also be further derived from correlations, or more advanced statistics (e.g. multivariate models) that show inherent linkage between parameters, but with constraints on the inputs and outputs and being guided by the relative logistical sequence extracted. Finally, parametric linkages can be directly input by sub-domain experts (e.g. transistor performance expert can input a model that relates material thickness and resistance to max frequency performance).

In one or more embodiments the EDI 96 also provides hot logistic tracking to highlight production tools or stages with known historical problems when attempting to identify root causes for new out of range values. Once such root causes are identified, a production process parameter can be modified.

For example, consider a manufacturing line that runs continuously with manufacturing assets always in process; any kind of flag can stop production and save scrap. The first action taken in response to root cause identification is that the root cause tool is inhibited—sometimes called an SPN (stop production notice), forcing all production on to other tools, and pausing other tools. Statistical flagging may trigger tool requalification, which involves the running of "dummy" qualification wafers to verify operation of the tool within specified tolerance. In a resource constrained scenario (must process 100 wafers/day, each tool can handle at most 80 a day), a tool WIP balance rule may be implemented, e.g. only 20% of production assets may be run on the suspect tool while analysis is underway. This prevents usage of the tool until it can be cleared for production after careful inspection.

In other cases, root cause identification will trigger engineering logistical actions. One such logistical action is a split lot, e.g. take one production lot and run half through one process tool, and half through another process tool, remerge the lot, and continue production to allow for a tightly controlled comparison, sometimes this is done multiple times. Also, a process flag may trigger a pulse lot sequence, where a bunch of lots are run together through a tool, but later process steps will be randomized across subsequent logistical steps to attempt to create more meaningful statistical isolation of the tool.

Lot randomizations are another action that can be triggered if it appears there may be some kind of processing time dependence (e.g. if it is suspected that a first wafer gets a harsher treatment than a last wafer due to chamber conditioning), where wafers will have their processing sequence shuffled or specifically ordered at a suspect tool, or in subsequent tools to create better statistical isolation. Multi-level statistical experiments may be generated, as process interactions can generate some of the results we investigate.

On other occasions, when the production unit itself is suspect, it will be flagged for disposition; this could be the result of seemingly erroneous (e.g. negative resistance) or highly unlikely (e.g. all die fail at exact same test, or in a stripe pattern), or extremely poor yield or other critical parameter. This review may reveal failure in the test apparatus or probes, data logging/database system, and may trigger re-testing of the production asset or simple clearing to the next step of production if not a mission-critical measure. In other cases, this may result in the asset being scrapped if extremely poor quality and low anticipated future yield.

Figure 18:
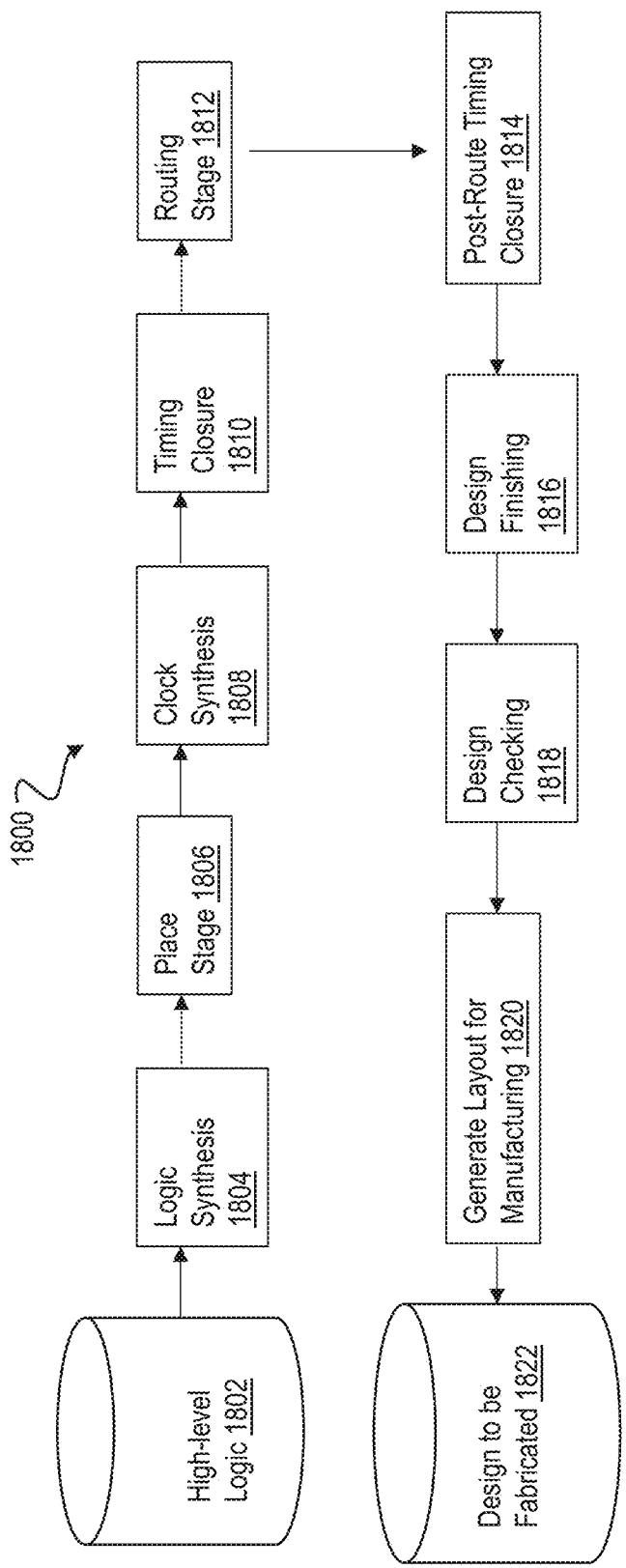
FIG. 18 shows an exemplary high-level Electronic Design Automation (EDA) tool flow, in connection with which aspects of the invention can be employed.

Generally, FIG. 18 describes an example high-level Electronic Design Automation (EDA) tool flow 1800, which is responsible for creating an optimized microprocessor design to be manufactured. A designer could start with a high-level logic description 1802 of the circuit (e.g. VHDL or Verilog). The logic synthesis tool 1804 compiles the logic, and optimizes it without any sense of its physical representation, and with estimated timing information. The placement tool 1806 takes the logical description and places each component, looking to minimize congestion in each area of the design. The clock synthesis tool 1808 optimizes the clock tree network by cloning/balancing/buffering the latches or registers. The timing closure step 1810 performs a number of optimizations on the design, including buffering, wire tuning, and circuit repowering; its goal is to produce a design which is routable, without timing violations, and without excess power consumption. The routing stage 1812 takes the placed/optimized design, and determines how to create wires to connect all of the components, without causing manufacturing violations. Post-route timing closure 1814 performs another set of optimizations to resolve any violations that are remaining after the routing. Design finishing 1816 then adds extra metal shapes to the netlist, to conform with manufacturing requirements. The checking steps 1818 analyze whether the design is violating any requirements such as manufacturing, timing, power, electromigration or noise. When the design is clean, the final step 1820 is to generate a layout for the design, representing all the shapes to be fabricated. The result is a design to be fabricated (physical design data) 1822. Various aspects of the invention relate to modifying one or more parameters of the physical design data 1822, in response to analysis of parametric production data using the EDI 96.

Figure 19:
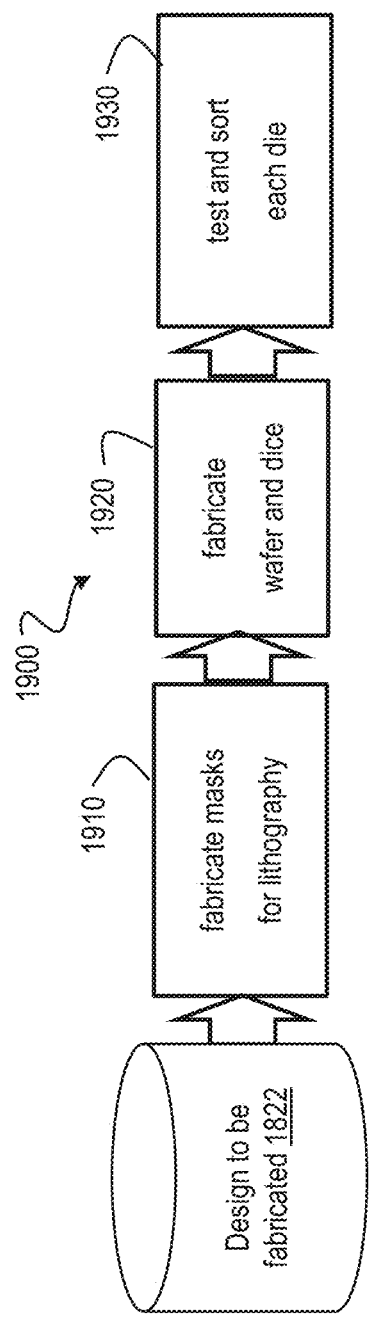
FIG. 19 shows aspects of integrated circuit (IC) fabrication from physical design data.

Once the physical design data 1822 has been obtained, an integrated circuit can be fabricated according to a production process 1900 that is generally described with reference to FIG. 19. Generally, a wafer with multiple copies of the final design is fabricated and cut (i.e., diced) such that each die is one copy of the integrated circuit. At 1910, the processes include fabricating masks for lithography based on the finalized physical layout. At 1920, fabricating the wafer includes using the masks to perform photolithography and etching. Once the wafer is diced, at 1930 each die is tested and sorted in order to filter out any faulty die. Various aspects of the invention relate to modifying one or more parameters of the production process 1900, e.g., the fabrication of masks 1910 and/or the photolithography and etching steps 1920, in response to analysis of parametric production data using the EDI 96.

Given the discussion thus far, it will be appreciated that, in general terms, an exemplary method for presenting parametric data, according to an aspect of the invention, includes displaying a first electronic spreadsheet that has a plurality of cells arranged in rows and columns, each row corresponding to a different parameter that is identified in the first column and each cell of each subsequent column displaying a value associated with the parameter identified in the corresponding row; receiving a click on a first cell of the first electronic spreadsheet that displays a parameter identifier of a first parameter; and in response to the click, displaying a second electronic spreadsheet that has a first row of cells displaying values associated with the first parameter and that has at least a second row of cells displaying values of one or more other parameters that are related to the first parameter.

In one or more embodiments, the first parameter is an HOL (health of line) metric. In one or more embodiments, the first parameter is a DC (direct current) metric. In one or more embodiments, the one or more other parameters are related to the first parameter by sharing a common production lot. In one or more embodiments, the one or more other parameters are related to the first parameter by sharing a common production tool. In one or more embodiments, the one or more other parameters are related to the first parameter by a recorded root cause analysis.

In another aspect, an exemplary method for production data analysis includes receiving production data at a processor from a plurality of tools spatially arranged within a manufacturing facility; creating a hierarchal topology of the data in a memory coupled in communication with the processor, wherein each level of the hierarchal topology is based on a different one of a plurality of static parameters that are selected from a list consisting of: a tool identifier, a batch identifier, and a spatial orientation; displaying, at a user interface implemented by the processor, a first analysis of a first level of the hierarchal topology, wherein the analysis contains parameters related to other levels of the hierarchal topology; receiving, via the user interface, a selection by a user of a first parameter displayed on the first analysis; and updating the user interface to display a second analysis of a second level of the hierarchal topology that is related to the first parameter.

In one or more embodiments, the second analysis contains at least one of the parameters that are related to other levels of the hierarchal topology. In one or more embodiments, the first analysis is displayed as a spreadsheet, with the first parameter being displayed as a hyperlinked cell in the spreadsheet, and the second analysis is displayed as a line chart, with the at least one of the parameters being displayed as a hyperlinked point on the chart. In one or more embodiments, the first analysis is displayed as a line chart, with the first parameter being displayed as a hyperlinked point on the chart, and the second analysis is displayed as a spreadsheet, with the at least one of the parameters being displayed as a hyperlinked cell in the spreadsheet. In one or more embodiments, the first analysis is displayed as a spreadsheet, with the first parameter being displayed as a hyperlinked cell in the spreadsheet, and the second analysis is displayed as a map of locations where the first parameter is out of range, with the at least one of the parameters being displayed as a hyperlinked label on the map.

In one or more embodiments, the first parameter is an HOL metric. In one or more embodiments, the first parameter is a DC metric. In one or more embodiments, the first parameter is a production lot identifier. In one or more embodiments, the first parameter is a production tool identifier.

In one or more embodiments, in response to the second analysis of the second level of the hierarchal topology, modify a production process parameter.

Figure 17:
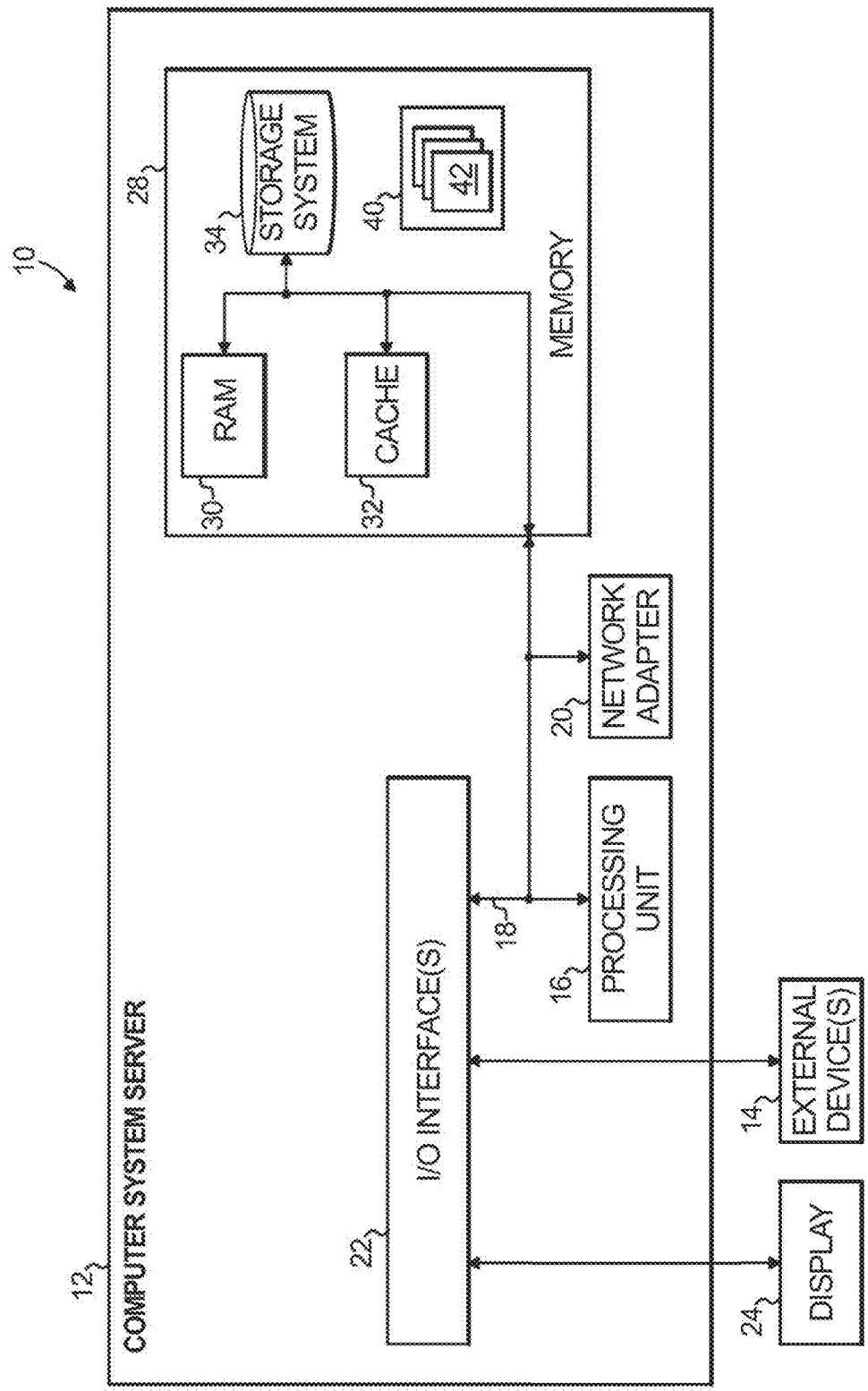
FIG. 17 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a computer readable storage medium that embodies computer executable instructions and at least one processor that is coupled to the memory and operative by the instructions to facilitate exemplary method steps, or in the form of a non-transitory computer readable medium embodying computer executable instructions which when executed by a computer cause the computer to facilitate exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create the electronic data interface 96. In one or more embodiments, all of the HTML is pre-calculated when the EDI 96 is first displayed, so that click-through links (e.g., 502, 604, 808 in FIG. 4) produce their targeted views of the EDI without human-perceptible delay.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for constructing a computerized user interface, the method comprising:
    displaying a first electronic spreadsheet that has a plurality of cells arranged in rows and columns, each row corresponding to a different parameter that is identified in the first column of the row and each cell of each subsequent column displaying a value associated with the parameter identified in the corresponding row;
    receiving a click on a first cell of the first electronic spreadsheet, wherein the first cell displays a parameter identifier of a first parameter, and the first parameter is a lot i.d.;
    in response to the click on the first cell of the first electronic spreadsheet, generating and displaying at least one intermediate spreadsheet and receiving at least one click on the at least one intermediate spreadsheet;
    in response to the at least one click on the at least one intermediate spreadsheet, generating a second electronic spreadsheet that represents data values of a first array of records that pertain to the first parameter, wherein data values of the second electronic spreadsheet are names of variables that pertain to the first parameter and that are ranked according to a metric selected from a list consisting of: out-of-sigma count and p-value; and
    further in response to the at least one click on the at least one intermediate spreadsheet, displaying the second electronic spreadsheet;
    in response to a user selection of a first filter in the second electronic spreadsheet, displaying a first data view that represents only data values of a second array of records that are a subset of the first array of records and match the first filter; and
    in response to a user selection of a second parameter value in the first data view, displaying a second data view that represents data values of a third array of records, which match the second parameter value and also match the first filter.

2. The method of claim 1, further comprising: displaying, in the second data view, only values of the third array of records, which are related to the first parameter by sharing a common production lot.

3. The method of claim 1, further comprising: displaying, in the second data view, only values of the third array of records, which are related to the first parameter by sharing a common production tool.

4. A method for production analysis comprising:
    receiving production data at a processor from a plurality of tools spatially arranged within a manufacturing facility;
    creating a hierarchal topology of the data in a memory coupled in communication with the processor, wherein each level of the hierarchal topology is based on a different one of a plurality of static parameters that are selected from a list consisting of: a tool identifier, a batch identifier, and a spatial orientation;
    displaying, at a user interface implemented by the processor, a first analysis of a first level of the hierarchal topology, wherein the analysis contains parameters related to other levels of the hierarchal topology;
    receiving, via the user interface, a selection by a user of a first parameter displayed in the first analysis, wherein the first parameter is a lot i.d.;
    in response to the selection of the first parameter displayed in the first analysis, generating and displaying at least one intermediate analysis and receiving at least one selection on the at least one intermediate analysis;
    in response to the at least one selection in the at least one intermediate analysis, generating a second analysis of a second level of the hierarchal topology, wherein the second level is related to the first parameter;
    further in response to the at least one selection in the at least one intermediate analysis, updating the user interface to display the second analysis of the second level of the hierarchal topology;
    in response to a user selection of a first filter in the display of the second analysis, displaying a third analysis that represents only data values of a subset of the data values in the second analysis; and
    in response to a user selection of a second parameter value in the third analysis, displaying a fourth analysis that represents data values that match the second parameter value and also match the first filter, wherein all of the data values of the fourth analysis pertain to the first parameter and include variable names that are ranked according to a metric selected from a list consisting of: out-of-sigma count and p-value.

5. The method of claim 4 wherein the second analysis contains at least one of the parameters that are related to other levels of the hierarchal topology.

6. The method of claim 5 wherein the first analysis is displayed as a spreadsheet, with the first parameter being displayed as a hyperlinked cell in the spreadsheet, and the second analysis is displayed as a line chart, with the at least one of the parameters being displayed as a hyperlinked point on the chart.

7. The method of claim 5 wherein the first analysis is displayed as a spreadsheet, with the first parameter being displayed as a hyperlinked cell in the spreadsheet, and the second analysis is displayed as a map of locations where the first parameter is out of range, with the at least one of the parameters being displayed as a hyperlinked label on the map.

8. The method of claim 4 further comprising, in response to the second analysis of the second level of the hierarchal topology, modifying a production process parameter.

9. An apparatus for production analysis, comprising:
    a computer readable storage medium embodying computer executable instructions; and
    at least one processor, coupled to the computer readable storage medium, and operative by the computer executable instructions to facilitate a method of:
        receiving production data at a processor from a plurality of tools spatially arranged within a manufacturing facility;
        creating a hierarchal topology of the data in a memory coupled in communication with the processor, wherein each level of the hierarchal topology is based on a different one of a plurality of static parameters that are selected from a list consisting of: a tool identifier, a batch identifier, and a spatial orientation;
        displaying, at a user interface implemented by the processor, a first analysis of a first level of the hierarchal topology, wherein the analysis contains parameters related to other levels of the hierarchal topology;

receiving, via the user interface, a selection by a user of a first parameter displayed in the first analysis, wherein the first parameter is a lot i.d.;

in response to the selection of the first parameter displayed in the first analysis, generating and displaying at least one intermediate analysis and receiving at least one selection in the at least one intermediate analysis;

in response to the at least one selection on the at least one intermediate analysis, generating a second analysis of a second level of the hierarchal topology wherein the second level is related to the first parameter;

further in response to the at least one selection on the at least one intermediate analysis, updating the user interface to display the second analysis of the second level of the hierarchal topology;

in response to a user selection of a first filter in the display of the second analysis, displaying a third analysis that represents only data values of a subset of the data values in the second analysis; and in response to a user selection of a second parameter value in the third analysis, displaying a fourth analysis that represents data values that match the second parameter value and also match the first filter, wherein all of the data values of the fourth analysis pertain to the first parameter and include variable names that are ranked according to a metric selected from a list consisting of: out-of-sigma count and p-value.

10. The apparatus of claim 9 wherein the first analysis is displayed as a spreadsheet, with the first parameter being displayed as a hyperlinked cell in the spreadsheet, and the second analysis is displayed as a line chart, wherein the second analysis contains at least one of the parameters that are related to other levels of the hierarchal topology, with the at least one of the parameters being displayed as a hyperlinked point on the chart.

11. The apparatus of claim 9 wherein the first analysis is displayed as a line chart, with the first parameter being displayed as a hyperlinked point on the chart, and the second analysis is displayed as a spreadsheet, wherein the second analysis contains at least one of the parameters that are related to other levels of the hierarchal topology, with the at least one of the parameters being displayed as a hyperlinked cell in the spreadsheet.

12. The apparatus of claim 9 wherein the first analysis is displayed as a spreadsheet, with the first parameter being displayed as a hyperlinked cell in the spreadsheet, and the second analysis is displayed as a map of locations where the first parameter is out of range, wherein the second analysis contains at least one of the parameters that are related to other levels of the hierarchal topology, with the at least one of the parameters being displayed as a hyperlinked label on the map.

13. The method of claim 1, further comprising, in response to the user selection of the first filter, generating the second data view by a background process before the user selects the second parameter value.

\* \* \* \* \*